(12) United States Patent
Gupta et al.

(10) Patent No.: US 10,382,132 B2
(45) Date of Patent: Aug. 13, 2019

(54) DIGITAL RADIO FREQUENCY TRANSCEIVER SYSTEM AND METHOD

(71) Applicant: Hypres, Inc., Elmsford, NY (US)

(72) Inventors: Deepnarayan Gupta, Briarcliff Manor, NY (US); Oleg Mukhanov, Putnam Valley, NY (US)

(73) Assignee: Hypres, Inc., Elmsford, NY (US)

( * ) Notice: Subject to any disclaimer, the term of this patent is extended or adjusted under 35 U.S.C. 154(b) by 0 days.

(21) Appl. No.: 15/404,950

(22) Filed: Jan. 12, 2017

(65) Prior Publication Data

US 2017/0134091 A1 May 11, 2017

Related U.S. Application Data

(60) Division of application No. 14/519,197, filed on Oct. 21, 2014, now Pat. No. 9,548,878, which is a continuation of application No. 13/602,474, filed on Sep. 4, 2012, now Pat. No. 8,867,931, which is a continuation of application No. 12/403,332, filed on Mar. 12, 2009, now Pat. No. 8,260,145, and a continuation of application No. 12/403,329, filed on Mar. 12, 2009, now Pat. No. 8,260,144, and a (Continued)

(51) Int. Cl.
*H04B 10/00* (2013.01)
*H04B 10/2575* (2013.01)
*H04L 27/20* (2006.01)
*H04B 10/69* (2013.01)
*H04B 10/40* (2013.01)
*H04B 10/556* (2013.01)

(52) U.S. Cl.
CPC ... *H04B 10/25752* (2013.01); *H04B 10/2575* (2013.01); *H04B 10/40* (2013.01); *H04B 10/5561* (2013.01); *H04B 10/697* (2013.01); *H04L 27/2096* (2013.01)

(58) Field of Classification Search
USPC .................................................. 398/115–117
See application file for complete search history.

(56) References Cited

U.S. PATENT DOCUMENTS 3,324,295 A 6/1967 Harris et al.
3,999,105 A 12/1976 Archey et al.
(Continued)

FOREIGN PATENT DOCUMENTS

GB 2107147 A 4/1983

*Primary Examiner* — Agustin Bello
(74) *Attorney, Agent, or Firm* — Tully Rinckey PLLC; Steven M. Hoffberg

(57) ABSTRACT

A transceiver architecture for wireless base stations wherein a broadband radio frequency signal is carried between at least one tower-mounted unit and a ground-based unit via optical fibers, or other non-distortive media, in either digital or analog format. Each tower-mounted unit (for both reception and transmission) has an antenna, analog amplifier and an electro-optical converter. The ground unit has ultrafast data converters and digital frequency translators, as well as signal linearizers, to compensate for nonlinear distortion in the amplifiers and optical links in both directions. In one embodiment of the invention, at least one of the digital data converters, frequency translators, and linearizers includes superconducting elements mounted on a cryocooler.

20 Claims, 6 Drawing Sheets

Digital-RF Transceiver

Related U.S. Application Data continuation of application No. 12/403,326, filed on Mar. 12, 2009, now Pat. No. 8,260,143.

(60) Provisional application No. 61/035,932, filed on Mar. 12, 2008.

(56) References Cited

U.S. PATENT DOCUMENTS

| | | | |
|---|---|---|---|
| 4,038,600 A | 7/1977 | Thomas | |
| 4,306,313 A | 12/1981 | Baldwin | |
| 4,561,119 A | 12/1985 | Epworth | |
| 4,805,235 A | 2/1989 | Henmi | |
| 4,841,519 A | 6/1989 | Nishio | |
| 4,922,452 A | 5/1990 | Larsen | |
| 4,953,157 A | 8/1990 | Franklin et al. | |
| 4,975,926 A | 12/1990 | Knapp | |
| 5,010,346 A | 4/1991 | Hamilton | |
| 5,067,173 A | 11/1991 | Gordon et al. | |
| 5,101,501 A | 3/1992 | Gilhousen et al. | |
| 5,247,309 A * | 9/1993 | Reich | H01Q 3/2676 342/175 |
| 5,253,309 A | 10/1993 | Nazarathy et al. | |
| 5,257,283 A | 10/1993 | Gilhousen et al. | |
| 5,274,381 A | 12/1993 | Riza | |
| 5,293,545 A | 3/1994 | Huber | |
| 5,321,849 A * | 6/1994 | Lemson | H03G 3/3052 398/209 |
| 5,325,378 A | 6/1994 | Zorabedian | |
| 5,339,184 A | 8/1994 | Tang | |
| 5,359,412 A | 10/1994 | Schulz | |
| 5,371,625 A | 12/1994 | Wedding et al. | |
| 5,373,383 A | 12/1994 | LaGasse | |
| 5,400,391 A | 3/1995 | Emura et al. | |
| 5,406,588 A | 4/1995 | Birchler | |
| 5,412,474 A | 5/1995 | Reasenberg et al. | |
| 5,416,629 A | 5/1995 | Huber | |
| 5,450,223 A | 9/1995 | Wagner et al. | |
| 5,457,734 A | 10/1995 | Eryaman et al. | |
| 5,465,264 A | 11/1995 | Buhler et al. | |
| 5,477,368 A | 12/1995 | Eskildsen et al. | |
| 5,485,009 A | 1/1996 | Meyzonnetie et al. | |
| 5,495,484 A | 2/1996 | Self et al. | |
| 5,550,667 A | 8/1996 | Krimmel et al. | |
| 5,566,173 A | 10/1996 | Steinbrecher | |
| 5,574,982 A | 11/1996 | Almgren et al. | |
| 5,579,341 A | 11/1996 | Smith et al. | |
| 5,592,327 A | 1/1997 | Gabl et al. | |
| 5,615,034 A | 3/1997 | Hori | |
| 5,640,414 A | 6/1997 | Blakeney, II et al. | |
| 5,644,622 A | 7/1997 | Russell et al. | |
| 5,710,651 A | 1/1998 | Logan, Jr. | |
| 5,737,104 A | 4/1998 | Lee et al. | |
| 5,751,242 A * | 5/1998 | Goutzoulis | G01S 7/032 342/157 |
| 5,777,773 A | 7/1998 | Epworth et al. | |
| 5,805,235 A | 9/1998 | Bedard | |
| 5,812,600 A | 9/1998 | Hess | |
| 5,852,651 A | 12/1998 | Fischer et al. | |
| 5,856,980 A | 1/1999 | Doyle | |
| 5,859,611 A | 1/1999 | Lam et al. | |
| 5,917,636 A | 6/1999 | Wake et al. | |
| 5,920,416 A | 7/1999 | Beylat et al. | |
| 5,920,821 A | 7/1999 | Seazholtz et al. | |
| 5,940,196 A | 8/1999 | Piehler et al. | |
| 5,953,139 A | 9/1999 | Nemecek et al. | |
| 5,963,567 A | 10/1999 | Veselka et al. | |
| 5,974,209 A | 10/1999 | Cho et al. | |
| 6,016,426 A | 1/2000 | Bodell | |
| 6,081,361 A | 6/2000 | Adams et al. | |
| 6,088,349 A | 7/2000 | Zumkeller | |
| 6,096,496 A | 8/2000 | Frankel | |
| 6,104,851 A | 8/2000 | Mahgerefteh | |
| 6,108,548 A | 8/2000 | Furukawa et al. | |
| 6,115,162 A | 9/2000 | Graves et al. | |
| 6,115,403 A | 9/2000 | Brenner et al. | |
| 6,125,276 A | 9/2000 | Lupien | |
| 6,137,612 A | 10/2000 | Startup | |
| 6,167,269 A | 12/2000 | Kondo | |
| 6,181,921 B1 | 1/2001 | Konisi et al. | |
| 6,188,808 B1 | 2/2001 | Zhou et al. | |
| 6,201,638 B1 | 3/2001 | Hall et al. | |
| 6,208,861 B1 | 3/2001 | Suzuki | |
| 6,222,861 B1 | 4/2001 | Kuo et al. | |
| 6,233,454 B1 | 5/2001 | Sato | |
| 6,246,500 B1 | 6/2001 | Ackerman | |
| 6,256,130 B1 | 7/2001 | Bulow | |
| 6,256,137 B1 | 7/2001 | Hironishi | |
| 6,271,959 B1 | 8/2001 | Kim et al. | |
| 6,298,186 B1 | 10/2001 | He | |
| 6,324,391 B1 | 11/2001 | Bodell | |
| 6,330,609 B1 | 12/2001 | Garofalakis et al. | |
| 6,331,991 B1 | 12/2001 | Mahgerefteh | |
| 6,351,651 B1 | 2/2002 | Hamabe et al. | |
| 6,359,716 B1 | 3/2002 | Taylor | |
| 6,366,309 B1 | 4/2002 | Siegle | |
| 6,366,778 B1 | 4/2002 | Bender et al. | |
| 6,381,234 B2 | 4/2002 | Sakoda et al. | |
| 6,459,743 B1 | 10/2002 | Lipka | |
| 6,473,214 B1 | 10/2002 | Roberts et al. | |
| 6,506,342 B1 | 1/2003 | Frankel | |
| 6,525,682 B2 * | 2/2003 | Yap | H03M 3/468 341/137 |
| 6,535,165 B2 | 3/2003 | Stephens | |
| 6,546,249 B1 | 4/2003 | Imai et al. | |
| 6,563,622 B2 | 5/2003 | Mueller et al. | |
| 6,563,623 B1 | 5/2003 | Penninckx et al. | |
| 6,577,013 B1 | 6/2003 | Glenn et al. | |
| 6,583,906 B1 | 6/2003 | Schemmann | |
| 6,594,070 B2 | 7/2003 | Sugata et al. | |
| 6,597,836 B2 | 7/2003 | Johnson et al. | |
| 6,600,794 B1 | 7/2003 | Agarossi | |
| 6,618,513 B2 | 9/2003 | Evankow, Jr. | |
| 6,634,811 B1 | 10/2003 | Gertel et al. | |
| 6,643,417 B2 | 11/2003 | Strutz et al. | |
| 6,654,564 B1 | 11/2003 | Colbourne et al. | |
| 6,654,595 B1 | 11/2003 | Dexter | |
| 6,665,351 B2 | 12/2003 | Hedberg | |
| 6,677,877 B2 | 1/2004 | Johnson | |
| 6,687,278 B1 | 2/2004 | Mason et al. | |
| 6,704,353 B1 | 3/2004 | McCarty, Jr. | |
| 6,724,523 B2 | 4/2004 | Yap | |
| 6,748,133 B2 | 6/2004 | Liu et al. | |
| 6,760,342 B1 | 7/2004 | Skones et al. | |
| 6,778,307 B2 | 8/2004 | Clark | |
| 6,781,435 B1 | 8/2004 | Gupta et al. | |
| 6,804,471 B1 | 10/2004 | Ionov et al. | |
| 6,810,047 B2 | 10/2004 | Oh et al. | |
| 6,826,163 B2 | 11/2004 | Mani et al. | |
| 6,826,164 B2 | 11/2004 | Mani et al. | |
| 6,834,134 B2 | 12/2004 | Brennan, III et al. | |
| 6,836,487 B1 | 12/2004 | Farmer et al. | |
| 6,847,758 B1 | 1/2005 | Watanabe | |
| 6,898,379 B2 | 5/2005 | Lenosky | |
| 6,901,224 B1 | 5/2005 | Davis | |
| 6,947,206 B2 | 9/2005 | Tsadka et al. | |
| 6,963,685 B2 | 11/2005 | Mahgerefteh et al. | |
| 6,996,345 B1 | 2/2006 | Chen | |
| 7,006,726 B2 | 2/2006 | Hayes | |
| 7,013,090 B2 | 3/2006 | Adachi | |
| 7,054,538 B2 | 5/2006 | Mahgerefteh et al. | |
| 7,057,716 B2 | 6/2006 | Yap | |
| 7,076,170 B2 | 7/2006 | Choa | |
| 7,079,780 B1 | 7/2006 | Rollins | |
| 7,123,846 B2 | 10/2006 | Tateyama et al. | |
| 7,127,172 B1 | 10/2006 | Chen | |
| 7,127,175 B2 | 10/2006 | Mani et al. | |
| 7,146,169 B2 | 12/2006 | Kahana | |
| 7,245,833 B1 | 7/2007 | Volkening | |
| 7,251,297 B2 | 7/2007 | Agazzi | |
| 7,263,291 B2 | 8/2007 | Mahgerefteh et al. | |
| 7,266,269 B2 | 9/2007 | Koste et al. | |
| 7,272,327 B2 | 9/2007 | Epworth | |
| 7,280,623 B2 | 10/2007 | Gupta et al. | |

(56) References Cited

U.S. PATENT DOCUMENTS

| | | | |
|---|---|---|---|
| 7,280,721 B2 | 10/2007 | McCallion et al. | |
| 7,302,185 B2 | 11/2007 | Wood et al. | |
| 7,312,199 B2 | 12/2007 | Burdick | |
| 7,313,199 B2 | 12/2007 | Gupta et al. | |
| 7,324,036 B2 | 1/2008 | Petre | |
| 7,362,125 B2 | 4/2008 | Gupta et al. | |
| 7,365,663 B2 | 4/2008 | Rylov et al. | |
| 7,366,470 B1 | 4/2008 | Green | |
| 7,369,715 B2 | 5/2008 | Darcie et al. | |
| 7,369,722 B2 | 5/2008 | Yilmaz et al. | |
| 7,369,779 B1 | 5/2008 | Croussore et al. | |
| 7,421,168 B1 | 9/2008 | Goutzoulis | |
| 7,423,252 B2 | 9/2008 | Zhao | |
| 7,424,228 B1 | 9/2008 | Williams et al. | |
| 7,426,350 B1 | 9/2008 | Sun et al. | |
| 7,440,490 B2 | 10/2008 | Kidiyarova-Shevchenko et al. | |
| 7,443,719 B2 | 10/2008 | Kirichenko et al. | |
| 7,446,696 B2 * | 11/2008 | Kondo | G01S 7/35 180/167 |
| 7,447,436 B2 | 11/2008 | Yee et al. | |
| 7,477,852 B2 | 1/2009 | Agarwal et al. | |
| 7,486,247 B2 | 2/2009 | Ridgway et al. | |
| 7,495,560 B2 | 2/2009 | Easton et al. | |
| 7,555,217 B2 | 6/2009 | Hillis et al. | |
| 7,590,354 B2 | 9/2009 | Sauer et al. | |
| 7,627,250 B2 | 12/2009 | George et al. | |
| 7,649,495 B2 | 1/2010 | Stephens | |
| 7,657,132 B1 | 2/2010 | Yap et al. | |
| 7,660,491 B2 * | 2/2010 | Thaniyavarn | H04B 10/25758 385/1 |
| 7,697,847 B2 | 4/2010 | Matsui et al. | |
| 7,738,602 B2 | 6/2010 | Langenbach | |
| 7,787,773 B1 * | 8/2010 | Kondo | G01S 7/352 398/115 |
| 7,787,823 B2 | 8/2010 | George et al. | |
| 7,822,075 B2 | 10/2010 | Liu | |
| 7,825,364 B1 | 11/2010 | Hillis et al. | |
| 7,848,654 B2 | 12/2010 | Sauer et al. | |
| 7,898,464 B1 | 3/2011 | Anderson et al. | |
| 8,027,588 B2 | 9/2011 | Kim et al. | |
| 8,059,969 B1 | 11/2011 | Yap | |
| 8,103,175 B1 | 1/2012 | Kowalczyk et al. | |
| 8,103,178 B2 | 1/2012 | McKinney | |
| 8,111,998 B2 | 2/2012 | George et al. | |
| 8,175,459 B2 | 5/2012 | Thelen et al. | |
| 8,260,143 B2 * | 9/2012 | Gupta | H04L 27/2096 398/115 |
| 8,260,144 B2 * | 9/2012 | Gupta | H04L 27/2096 398/115 |
| 8,260,145 B2 * | 9/2012 | Gupta | H04L 27/2096 398/115 |
| 8,275,265 B2 | 9/2012 | Kobyakov et al. | |
| 8,515,285 B2 | 8/2013 | DeSalvo et al. | |
| 8,538,272 B1 | 9/2013 | Robinson | |
| 8,548,330 B2 | 10/2013 | Berlin et al. | |
| 8,644,844 B2 | 2/2014 | Shapira et al. | |
| 8,693,875 B2 | 4/2014 | Banwell et al. | |
| 8,718,478 B2 | 5/2014 | Thelen et al. | |
| 8,787,776 B2 | 7/2014 | Carusone | |
| 8,831,428 B2 | 9/2014 | Kobyakov et al. | |
| 8,867,919 B2 | 10/2014 | Logan | |
| 8,867,931 B2 * | 10/2014 | Gupta | H04L 27/2096 398/115 |
| 8,873,585 B2 | 10/2014 | Oren et al. | |
| 8,913,892 B2 | 12/2014 | Berlin et al. | |
| 9,020,362 B2 | 4/2015 | Gupta | |
| 9,172,471 B2 | 10/2015 | Hutchinson | |
| 9,335,406 B2 * | 5/2016 | Lohr | G01S 13/86 |
| 2001/0005437 A1 | 6/2001 | Masuda | |
| 2002/0060827 A1 | 5/2002 | Agazzi | |
| 2002/0080898 A1 | 6/2002 | Agazzi | |
| 2002/0111150 A1 * | 8/2002 | Pleasant | H04B 1/525 455/313 |
| 2002/0131662 A1 | 9/2002 | Strutz et al. | |
| 2002/0154372 A1 | 10/2002 | Chung et al. | |
| 2002/0159490 A1 | 10/2002 | Karwacki | |
| 2002/0163454 A1 * | 11/2002 | Yap | H03M 3/468 341/137 |
| 2002/0175776 A1 * | 11/2002 | Pleasant | H04B 10/25752 333/17.1 |
| 2002/0176659 A1 | 11/2002 | Lei et al. | |
| 2002/0186094 A1 | 12/2002 | Pleasant et al. | |
| 2003/0002120 A1 | 1/2003 | Choa | |
| 2003/0030868 A1 | 2/2003 | Sasai et al. | |
| 2003/0067952 A1 | 4/2003 | Tsukiji et al. | |
| 2003/0099018 A1 | 5/2003 | Singh et al. | |
| 2003/0147114 A1 | 8/2003 | Kang et al. | |
| 2003/0175033 A1 | 9/2003 | Taga et al. | |
| 2003/0193974 A1 | 10/2003 | Frankel et al. | |
| 2003/0198477 A1 | 10/2003 | Kuri et al. | |
| 2004/0008933 A1 | 1/2004 | Mahgerefteh et al. | |
| 2004/0008937 A1 | 1/2004 | Mahgerefteh et al. | |
| 2004/0022332 A1 | 2/2004 | Gupta | |
| 2004/0036943 A1 | 2/2004 | Freund et al. | |
| 2004/0070515 A1 | 4/2004 | Burkley et al. | |
| 2004/0076199 A1 | 4/2004 | Wipiejewski et al. | |
| 2004/0086275 A1 | 5/2004 | Lenosky | |
| 2004/0096221 A1 | 5/2004 | Mahgerefteh et al. | |
| 2004/0208590 A1 | 10/2004 | Nabors et al. | |
| 2004/0218890 A1 | 11/2004 | Mahgerefteh et al. | |
| 2005/0047780 A1 | 3/2005 | Hoshida | |
| 2005/0052255 A1 | 3/2005 | Chiang | |
| 2005/0100345 A1 | 5/2005 | Welch et al. | |
| 2005/0111852 A1 | 5/2005 | Mahgerefteh et al. | |
| 2005/0123301 A1 * | 6/2005 | Kallstenius | H04B 10/1125 398/115 |
| 2005/0175356 A1 | 8/2005 | McCallion et al. | |
| 2005/0206989 A1 | 9/2005 | Marsh | |
| 2005/0260983 A1 | 11/2005 | DiPiazza | |
| 2005/0271394 A1 | 12/2005 | Whiteaway et al. | |
| 2005/0286829 A1 | 12/2005 | Mahgerefteh et al. | |
| 2006/0002718 A1 | 1/2006 | Matsui et al. | |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0228120 A9 | 10/2006 | McCallion et al. | |
| 2006/0232760 A1 | 10/2006 | Asbrock | |
| 2006/0233556 A1 | 10/2006 | Mahgerefteh et al. | |
| 2006/0239630 A1 | 10/2006 | Hase et al. | |
| 2006/0274861 A1 | 12/2006 | Langenbach | |
| 2006/0274993 A1 | 12/2006 | Mahgerefteh et al. | |
| 2007/0008530 A1 | 1/2007 | Gibbs | |
| 2007/0098417 A1 | 5/2007 | Peral et al. | |
| 2007/0140703 A1 | 6/2007 | Fells | |
| 2007/0206956 A1 | 9/2007 | Kikushima et al. | |
| 2007/0297803 A1 * | 12/2007 | Peral | H03F 1/32 398/140 |
| 2008/0101444 A1 | 5/2008 | Gupta | |
| 2008/0101501 A1 | 5/2008 | Gupta | |
| 2008/0101503 A1 | 5/2008 | Gupta | |
| 2008/0101798 A1 * | 5/2008 | Healey | H04B 10/25759 398/115 |
| 2008/0107213 A1 | 5/2008 | Gupta | |
| 2008/0212968 A1 * | 9/2008 | Lindop | H04B 10/032 398/91 |
| 2008/0212974 A1 | 9/2008 | Davies et al. | |
| 2009/0232507 A1 * | 9/2009 | Gupta | H04L 27/2096 398/115 |
| 2009/0232510 A1 | 9/2009 | Gupta | |
| 2009/0238305 A1 | 9/2009 | Agazzi | |
| 2009/0263137 A1 | 10/2009 | Hossein-Zadeh et al. | |
| 2009/0263144 A1 | 10/2009 | McKinney | |
| 2009/0297155 A1 | 12/2009 | Weiner et al. | |
| 2010/0111540 A1 | 5/2010 | Caplan et al. | |
| 2010/0166423 A1 | 7/2010 | Chang | |
| 2010/0247104 A1 | 9/2010 | Yu et al. | |
| 2010/0290551 A1 | 11/2010 | Agazzi | |
| 2011/0064415 A1 | 3/2011 | Williams et al. | |
| 2012/0141122 A1 | 6/2012 | Carusone | |
| 2012/0315049 A1 | 12/2012 | Banwell et al. | |

(56) References Cited

U.S. PATENT DOCUMENTS

| | | | |
|---|---|---|---|
| 2012/0328301 A1* | 12/2012 | Gupta | H04L 27/2096 398/116 |
| 2013/0004180 A1* | 1/2013 | Gupta | H04L 27/2096 398/115 |
| 2013/0230328 A1 | 9/2013 | Fan et al. | |
| 2014/0112374 A1 | 4/2014 | Braz et al. | |
| 2014/0270807 A1 | 9/2014 | Hutchinson | |
| 2015/0125155 A1* | 5/2015 | Gupta | H04L 27/2096 398/115 |
| 2017/0134091 A1* | 5/2017 | Gupta | H04L 27/2096 |

\* cited by examiner

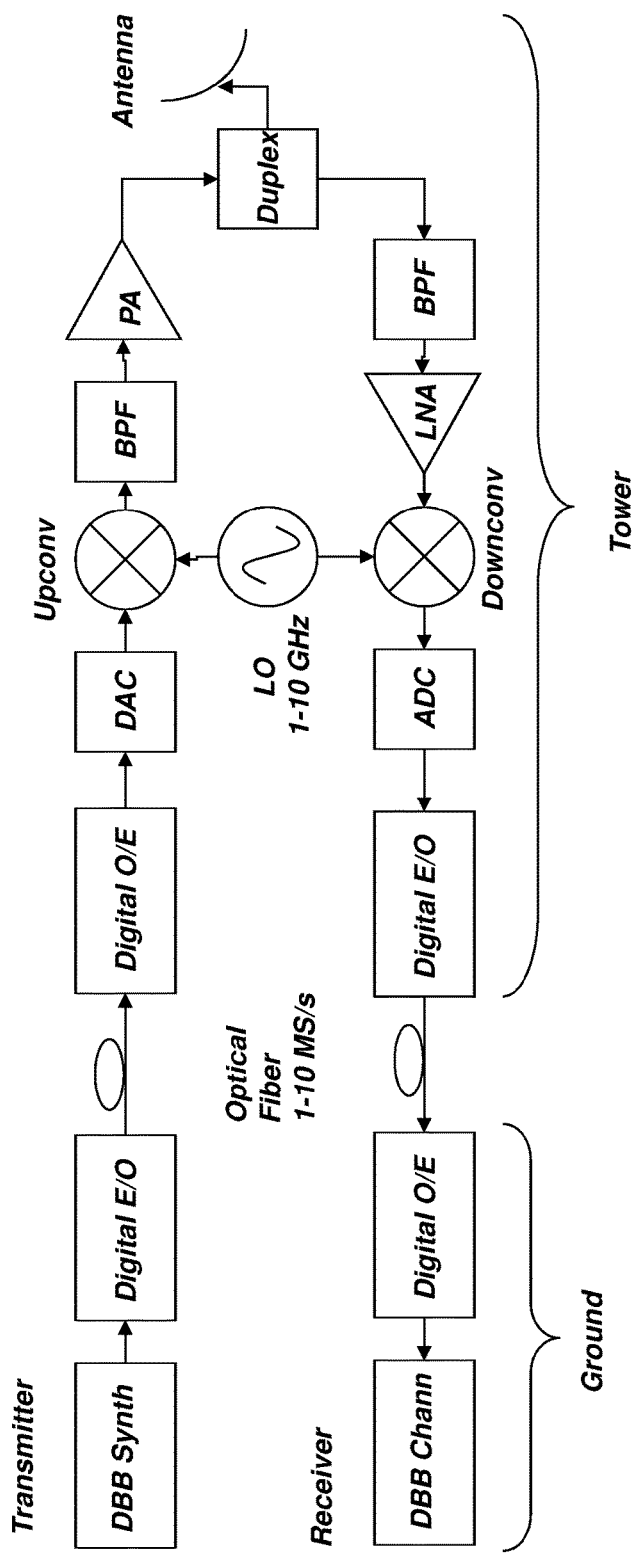
FIG. 1. *Prior Art Transceiver*

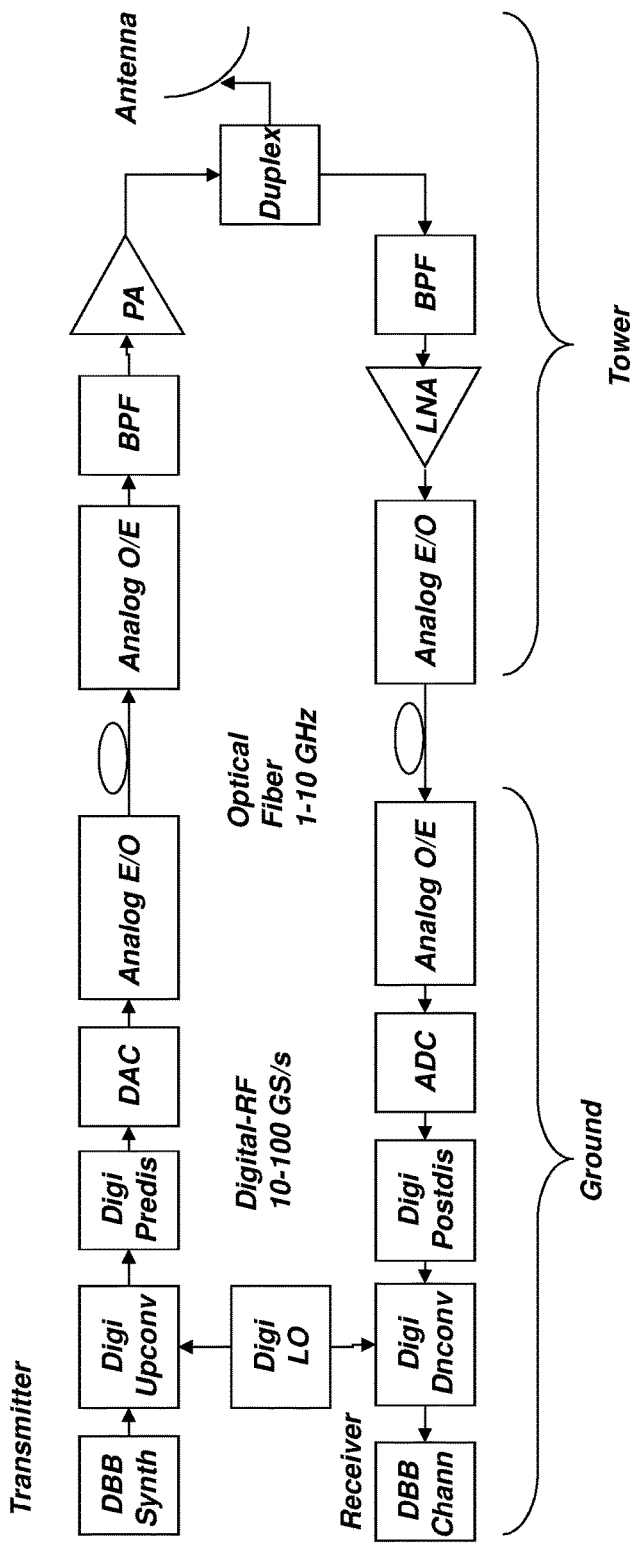
FIG. 2. Digital-RF Transceiver

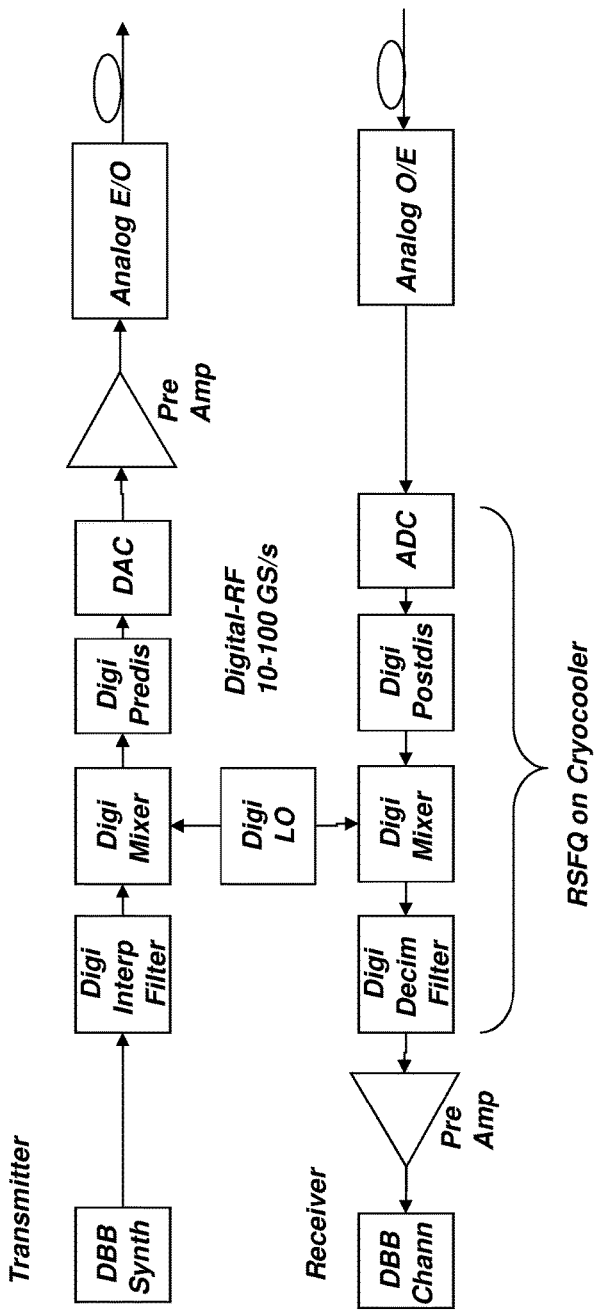
FIG. 3. RSFQ Blocks of Digital-RF Transceiver

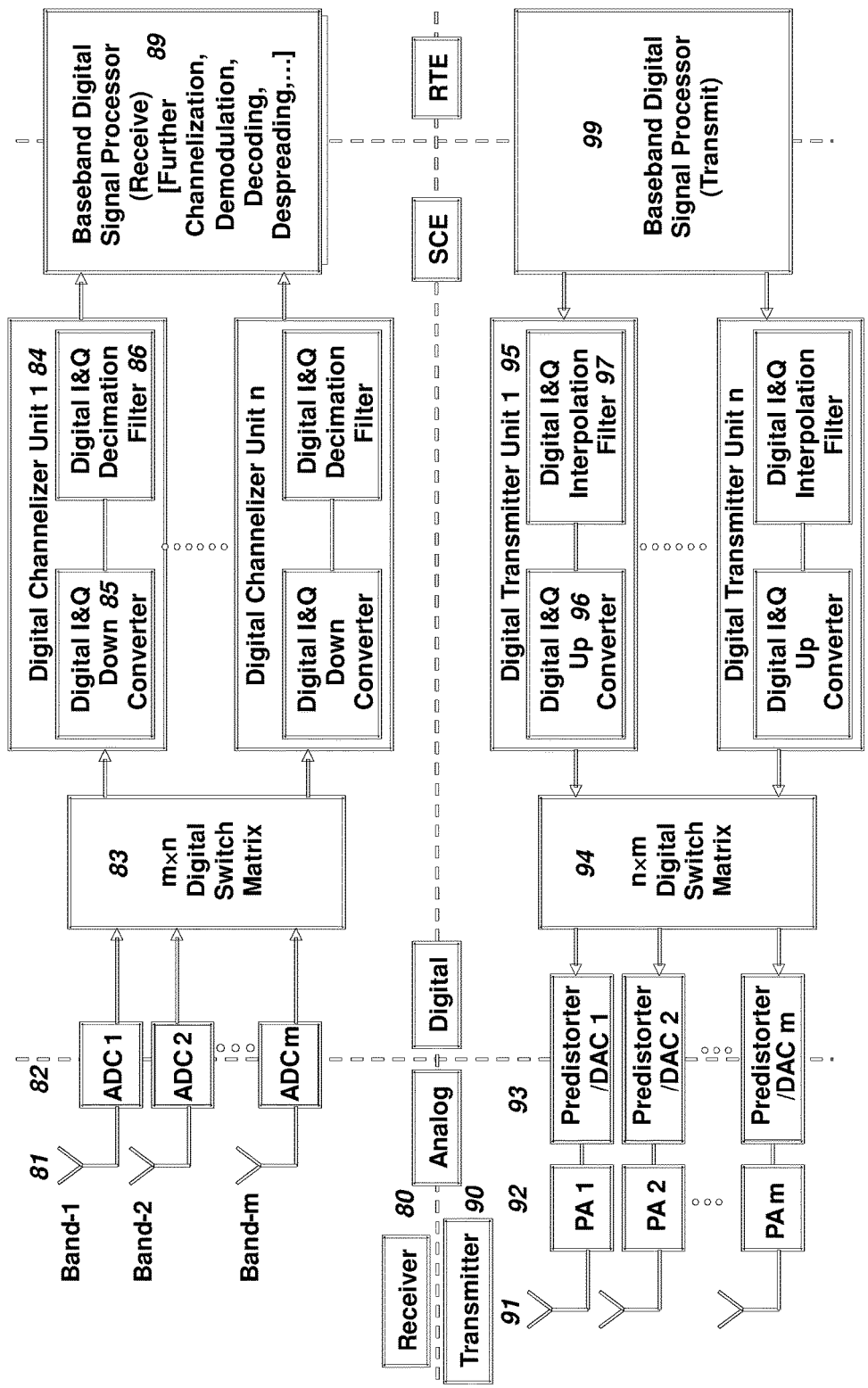
FIG. 4. Digital-RF™ Multichannel Transceiver

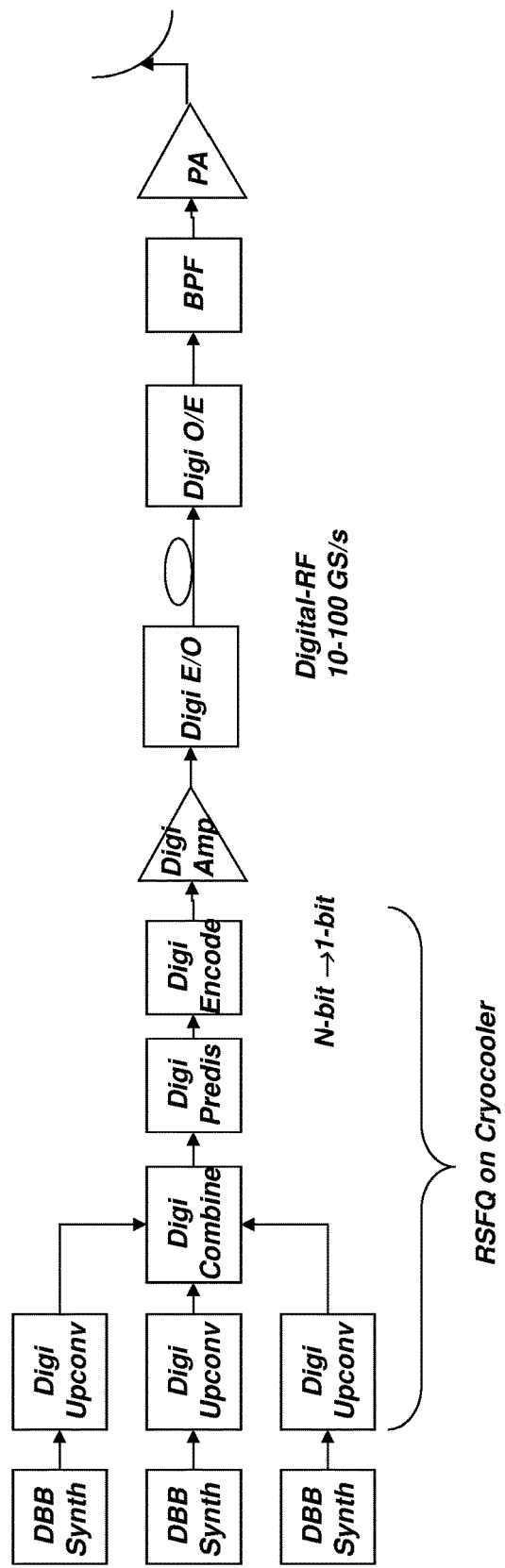
FIG. 5. Alt. Digital-RF Optical Transmit Link

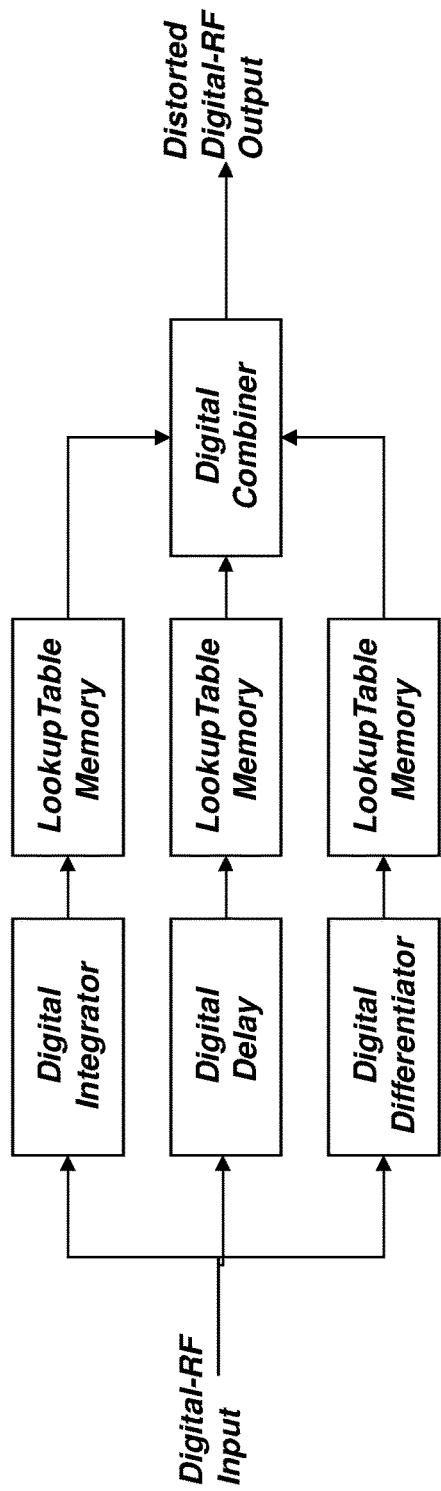
FIG. 6.  *Lookup Table Linearizer with Proportional-Integral-Differential Control*

DIGITAL RADIO FREQUENCY TRANSCEIVER SYSTEM AND METHOD

RELATED APPLICATIONS

The present application is a Division of U.S. patent application Ser. No. 14/519,197, filed Oct. 21, 2014, now U.S. Pat. No. 9,548,878, issued Jan. 17, 2017, which is a Continuation of U.S. patent application Ser. No. 13/602,474, filed Sep. 4, 2012, now U.S. Pat. No. 8,867,931, issued Oct. 21, 2014, which is a Continuation of U.S. patent application Ser. No. 12/403,332, filed Mar. 12, 2009, now U.S. Pat. No. 8,260,145, issued Sep. 4, 2012, and is a Continuation of U.S. patent application Ser. No. 12/403,329, filed Mar. 12, 2009, now U.S. Pat. No. 8,260,144, issued Sep. 4, 2012, and is a Continuation of U.S. patent application Ser. No. 12/403,326, filed Mar. 12, 2009, now U.S. Pat. No. 8,260,143, issued Sep. 4, 2012, each of which claims the benefit of priority of Provisional Patent Application 61/035,932, filed, Mar. 12, 2008, the entirety of which are expressly incorporated herein by reference.

FIELD OF THE INVENTION

The present invention is directed towards radio-frequency (RF) transceivers, and more specifically towards transceivers that use direct digitization of RF signals, and digital processing thereof.

BACKGROUND OF THE INVENTION

A simple RF signal consists of a narrowband baseband signal which is modulated onto a high-frequency RF carrier. A more complex, broader bandwidth RF signal may consist of multiple narrowband signals modulated on similar RF carriers. A conventional RF digital data receiver uses an analog mixer and local oscillator (LO) to translate the signal from the carrier to a lower frequency, the baseband or intermediate frequency (IF), where it is then typically digitized and further signal extraction is performed in the digital domain. Similarly a conventional RF digital data transmitter works in the reverse direction, converting a digital baseband or IF signal to analog, followed by mixing it with the LO signal to upconvert the signal. It is then amplified for transmission through the antenna.

In many wireless communications systems, the antennas are mounted on a tall tower, and the digital processing is carried out in basestations located remote from the antenna, e.g., on the ground. It is not practical or efficient to carry GHz-range (microwave) RF signals long distances over coaxial lines, since signal attenuation is too high. Therefore, the conventional partitioning of the system places amplifiers and analog mixers on the tower with the antenna, as shown in FIG. 1. The lower-frequency baseband or IF signal can then be carried to and from the ground station with minimal attenuation loss using known and standard coaxial cable. For longer distances or broader bands, low-attenuation optical fibers have been used to carry this baseband or IF signal, typically in digital form.

Optic fiber systems capable of communicating microwave signals are known. These are typically applied in military radar applications.

A critical requirement in wireless communication systems is maintaining linearity on both transmission and reception. That is, the analog signal should not be subject to distortions that result in the alteration of signal composition within the band of interest. Spurious intermodulations from signal components within the band of interest can limit the useful dynamic range (called the spurious-free dynamic range or SFDR) of a receiver or transmitter system. Thus, in a narrow band system, non-linearities which result in spurious energy in frequencies outside of the band of interest are generally tolerable, since these are readily filtered or ignored. On the other hand, as the bandwidth of the signal of interest grows wider, the possibility of significant spurious signals in the band of interest due to non-linearities in the signal processing and transmission chain grows. These are not readily filtered or ignored, and therefore present limitations of the system.

In a radio system, non-linearities in the signal processing chain generally produce spurs or intermodulation products between components of the signal. The wider than the band of the signal processed, the greater the probability for intermodulation components (spurs) which lie within the band itself, and therefore cannot be eliminated with a band-pass filter. One strategy to avoid misinterpretation of such spurs is to employ a deconvolution process in the receiver to predict the effect of the non-linearity on the signal, and reverse its effects. However, this requires a receiver for the full bandwidth of the transmitter signal processing chain, which may be untenable. In general, it is preferred to avoid non-linearities, and where present, limit their effects as much as possible, so that the intermodulation products may be treated as noise.

A number of metrics specifying system performance are available. For example, the "Spur-free Dynamic Range" or SFDR, is a commonly used metric which presumes a relatively small number of high power signal components which produce intermodulation distortions, and therefore the parameter specifies the dynamic range of the system before spurs interfere with signal interpretation.

Spurious Free Dynamic Range is the usable dynamic range of a system before spurious noise interferes or distorts the fundamental signal. SFDR is the measure of the difference in amplitude between the fundamental signals and the largest harmonically or non-harmonically related spur within the band of operation. A spur is any frequency bin on a spectrum analyzer, or from a Fourier transform. Spur-free dynamic range (SFDR), as generally used, attempts to define receiver dynamic range in terms of two undesired interferers and the receiver noise floor. The spur-free dynamic range is the difference in dB between the receiver noise floor and the level of each of equal-amplitude signals that produce an in-band spurious product equal in power to the noise floor. Generally, the receiver third-order intercept point is used to predict the spurious product, but often the second-order distortion dominates.

The SFDR specification overlooks several important factors which influence dynamic range. First, it attempts to model interference by using just two (or perhaps up to 4) interfering signals. This overcomes some of the objections to single-tone testing, but the real signal environment is usually populated by a multitude of signals. Second, it does not reveal the effects of reciprocal mixing or compression like the desensitization dynamic-range test. Third, it does not effectively test the effects of receiver input filtering (preselection). Finally, SFDR, as it is ordinarily specified, considers only the third-order distortion. In fact, for many receivers, especially those with modest input filters, the second-order products may dominate.

Another metric employed is the "Noise Power Ratio" or NPR, which models the signal as white noise within a band, and then measures the noise floor at narrow ranges within the band resulting principally from intermodulation distortion.

These metrics are therefore extremes of a continuum which seeks to characterize a system to determine the impact of intermodulation distortion on in-band signals; the SFDR measures a specific effect of a small number, e.g., 2-4 signals, while the NPR measures the statistical effect of essentially an infinite number of signals which appear as white noise.

In a wideband system, the true SFDR measurement becomes difficult, since it may be difficult to determine a worst case effect without testing each different combination of signals, and the presumptions typically made for narrow band systems regarding the dominance of the third order intermodulation product. On the other hand, white noise itself is a statistical process, and the time of measurement is a relevant factor. For example, over short periods, intermodulation components from various spectral components within the white noise may cancel or reinforce each other, leading to a misleading measurement. Since each of these metric is presented as a simple ratio (often specified in decibels), care must be exercised in interpretation.

As used herein, the SFDR is intended to encompass the ratio of one or more respective signal components of equal amplitude within a band and their largest in-band intermodulation product, of any order, but excluding artifacts, such as a superposition of multiple intermodulation products. In cases where the SFDR is specified for a composite system with band-limiting filters, the input signals may take any value within the permissible input range, while the measurements are made after band-limiting.

The performance of high power amplifiers with many carriers (>10) is normally tested using a noise power ratio (NPR) measurement technique. In this test, white noise is used to simulate the presence of many carriers of random amplitude and phase. In a traditional test setup, the white noise is first passed through a bandpass filter (BPF) to produce an approximately square spectral pedestal of noise of about the same bandwidth as the signals being simulated. This signal is then passed through a narrow band-reject filter to produce a deep notch (typ. >50 dB) at the center of the noise pedestal. This noise signal is used to excite the test amplifier, which produces intermodulation distortion products that tend to fill in the notch. The depth of the notch at the output of the amplifier can be observed with a spectrum analyzer, and is the measure of the NPR.

NPR can be considered a measure of multi-carrier intermodulation ratio (C/I). NPR differs from multi-carrier C/I in that it is the ratio of carrier plus intermodulation to intermodulation (C+I/I). At higher ratios (C/I>20 dB), the two measures will approach the same value. The bandwidth of the noise source should be much wider the bandwidth of the BPF to insure the statistical distribution of the noise power resembles a random phase multicarrier source. The width of the noise pedestal is usually made equal to bandwidth of the channel under test. The width of the notch should be about 1 percent or less of the width of the noise pedestal.

As used herein, the NPR is intended to encompass the dynamic range of a white noise signal representing the full band range of a permissible input signal, with uniform amplitude, with an output signal from which the input signal is subtracted. Traditionally, such a measurement is obtained by providing a notch filter at the input for a narrow frequency, and then measuring the output within that notch band. On the other hand, digital processing techniques permit a more rigorous characterization. For example, a notch filter is not necessary; the output across the band can be compared with the input, and deviations characterized. In that case, the deviation can be expressed as a ratio to the input signal, and for example, a worst case deviation reported as the noise power ratio. In some cases, especially across a large band, the input amplitude power is not uniform. Since signal from one communication stream may interfere with signal from another, which has a different power spectrum, the NPR may be functionally specified based on real signal types, which may differ from equal amplitude noise across the band.

Thus, for example, in a wideband system which handles multiple smaller bands concurrently, a theoretical NPR may not yield fully functionally valuable information as compared to signal models. Typical signal types of interest are cellular communications, which include CDMA (and variants), GSM, LTE, WiMax, etc. Therefore, in addition to characterizing the performance with respect to a white noise across the wide band, it may be useful to determine a bit error rate (BER) of a specified model signal at a specified attenuation, or alternately, the limiting attenuation until a specified BER is achieved, in the presence of other types of signals in the remainder of the band. Since this type of characterization is communication protocol type-specific, it would not be generally useful for generic systems. Note that in some cases, the relative amplitude of signals within the broadband signal may be adjusted to optimize net performance; for example, if one signal interferes with that in an adjacent band, and both are not required to operate at maximum power, then one may be attenuated with respect to the other to achieve acceptable performance for both.

A primary source of nonlinearity in conventional transmission systems is the power amplifier (PA). In general, highly linear PAs (including semiconductor transistor PAs) are energy-inefficient, large and heavy. PAs that are compact and efficient tend to be highly nonlinear. A modern wireless communication system that requires many antennas and PAs on a given transmission tower may use, or even require the use of, relatively nonlinear PAs.

This nonlinearity limits the performance of the transceiver system, and must be corrected. Several linearization techniques are known in the prior art. Most of these techniques operate on the baseband signal before upconversion (see FIG. 1), or equivalently on the amplitude and phase of the RF signal. One such technique is predistortion, wherein a signal is deliberately distorted in such a way seeking to cancel the distortion that would be generated by the PA. These linearization techniques are generally limited to narrow-band signals, and furthermore the nonlinearities tend to become worse as the bandwidth increases.

It is well known in the prior art that there are important potential advantages to combining multiple RF signals in nearby bands to create single broadband signal. For example, this could substantially reduce the number of RF components required. However, the problems associated with nonlinear PAs and the inability to sufficiently correct their distortions severely limit the bandwidth of such a combined signal to less than about 100 MHz. Conventional technology does not have a solution to this problem, which makes broader band RF systems impractical.

Recently, a superconducting electronic technology (known as rapid-single-flux-quantum logic or RSFQ) has been demonstrated that can provide direct digitization of RF signals, as well as ultrafast digital processing at clock rates up to 40 GHz, with rates up to 100 GHz expected in the near future. This permits representation of RF signals in a directly digitized format, at broadcast frequencies, referred to as "Digital RF"™ (Hypres Inc.), wherein the sample rate is much larger than the carrier frequency, e.g., above the Nyquist rate. This provides a promising approach to very broadband multi-carrier RF communication signals (See, U.S. Pat. Nos. 7,280,623, 7,365,663, 7,362,125, 7,443,719, expressly incorporated herein by reference). However, RSFQ is an ultra-low-power technology (sub-mV level signals) that requires cooling to temperatures of 4 K (−269 C). Existing refrigeration technology makes it impractical to place these cryocooler systems on cellular towers, so they must be placed in ground stations. In that case, transmission losses of the RF signals between the ground and the tower largely eliminate the potential performance advantages. On the other hand, if the existing cryocoolers were sought to be placed on the tower, this would increase wind loading and power consumption on the tower, and potentially lead to increased maintenance costs due to potential servicing of the cryocooler in an inaccessible location. Since the tower electronics are standardized for various applications, even in cases where the tower components are accessible or increased maintenance and service permissible, the lack of economies of scale still make such installations infeasible.

Optical fibers would seem to be a promising alternative, since attenuation losses on fibers are quite small. However, the electro-optic (E/O) and opto-electronic (O/E) converters for prior-art multi-GHz analog signals had severe limitations in performance, again greatly reducing the performance advantages of the superconducting system. These converter limitations reflect both limits in bandwidth and limits in linearity. It is difficult to simultaneously achieve high bandwidth and high linearity, particularly in a reliable and inexpensive manufactured product. See, for example, U.S. Pat. No. 7,424,228, expressly incorporated herein by reference. There are several known methods for reducing non-linearity (see, for example, U.S. Pat. No. 7,426,350, expressly incorporated herein by reference), but this remains a difficult problem.

The distinctions between digital and analog E/O (and O/E) modulators should be appreciated, which are directly analogous to the distinctions between digital and analog amplifiers. Digital amplifiers and modulators are nonlinear one-bit threshold devices, where only bit-errors are important. In contrast, analog amplifiers and modulators are generally required to be linear over a wide dynamic range, while nonlinearities generate intermodulations that reduce the useful spur-free dynamic range (SFDR). Digital optical modulators are long established for high-speed digital optical communications. In contrast, the technology of linear optical systems at microwave frequencies (microwave photonics or radio-over-fiber, or "RoF") has been developing only over the past decade, with further improvements in performance continuing. For E/O converters, direct modulation of diode lasers is typically used for RF frequencies below a few GHz, while electro-optic interferometric modulation is used for higher frequencies. Photodiodes are used for O/E converters. The nonlinearity associated with such an optical link increases sharply with increasing bandwidth. A typical optical link specification may be expressed by SFDR=100 dB/B$^{2/3}$, corresponding to 3$^{rd}$-order intermodulation, where B is the bandwidth in dB-Hz. For a 10 GHz signal, corresponding to 100 dB-Hz, the link SFDR would be reduced to 33 dB. This would likely be quite sufficient for a digital signal, but would be too low for a high-dynamic range analog signal.

The low-power aspect of this superconducting technology requires the use of high-gain, high-bandwidth semiconductor amplifiers, which are near the limits of semiconductor technology, and commercial product is generally unavailable. Various non-ideal aspects of these amplifiers, especially nonlinear distortion, tend to degrade the performance of the overall system. Very recently, the same superconducting RSFQ technology has demonstrated the capability to provide very broadband digital predistortion directly on the digitized RF signal, for a digital-RF transmission system with a nonlinear PA. See, e.g., U.S. Pat. No. 7,313,199, expressly incorporated herein by reference. This can achieve much greater improvement in broadband system SFDR than would be possible using conventional baseband predistorters, and might be used to make these broadband systems practical. However, the link between the ground and tower units remains a problem.

SUMMARY OF THE INVENTION

One aspect of the present invention addresses these shortcomings and seeks to provide a hybrid system that combines these three technologies of superconducting RSFQ circuits, microwave-frequency optical links, and broadband semiconductor power amplifiers, in a way that builds on superior features of each and corrects the non-idealities that limit practical performance.

A new system architecture is presented for an RF transceiver in a wireless communication base station, wherein ultrafast multi-GHz digital data conversion and processing are carried out in a central ground station, and analog-RF amplification is carried out in tower-mounted units close to antennas. No analog mixing is necessary in the tower, since the signal communicated to the tower is a direct representation of the radio frequency signal to be transmitted. The ground station is linked to the tower units by means of broadband RF signals carried on optical fibers in either analog or digital format, in contrast to prior-art systems that carry only baseband (or IF) signals. High-speed digital processing of the full digital-RF signal is used to correct for nonlinearities in amplifiers and electro-optic converters in both transmitter and receiver, as shown in FIG. 2. In a preferred embodiment of the invention, the high speed digital processing and data conversion are carried out using a superconducting RSFQ processor, operating at cryogenic temperatures in a cryocooler, as shown in FIG. 3, which therefore provides the cryocooler and superconducting components in the base station, and not on the tower. (It should be noted that the "base station" may in some cases be physically integrated with the tower/antenna complex, though the functions remain separated as discussed herein).

The technology provides a new architecture for a radio system, leveraging the ultrafast digital-to-analog converter, analog-to-digital converter, and digital signal processing technologies presented herein.

In the case of low temperature superconductors, a cryocooler is required, which consumes energy to achieve cryogenic temperatures, i.e., <10K, and has a physical size. In addition, the cryocooler presents a possible service and maintenance issue, and a preference may therefore exist to have such a cryocooler located off an antenna, and, for example, in a base station located on the ground, or rooftop, or otherwise some distance from the antenna structure. On the other hand, the transmit channel of the radio system typically has at least a power amplifier located in close proximity to the antenna, and the receive channel has at least a receive amplifier, typically a low noise amplifier, located in close proximity to the antenna. Therefore, aspects of the present technology address efficient and effective communication of signals from the antenna electronics system to a remote location.

A particular issue addressed in accordance with the present technologies is an avoidance of frequency translation between an analog radio frequency interface and digital electronics, which leads to distortion and degradation of wideband radio frequency signals. For example, a wideband radio frequency signal may be greater than 19.5 MHz (20 MHz band spacing less guard-band), for example, 40 MHz (two adjacent 20 MHz bands) or 60 MHz (3 adjacent bands). Indeed, using high speed digital electronics, it is possible to process, at native frequency, signals having bandwidths of in excess of 100 MHz. A particular advantage is possible where the antenna system communicates on multiple discontiguous bands, for example, 3 bands within a 120 MHz range, since a system implemented in accordance herewith would be agnostic to the band selection, and therefore be more versatile and adaptive.

For high fidelity, large bandwidth radio frequency signals, the communication medium of choice is an optic fiber, though coaxial or other impedance controlled electrical cable may be employed. However, each of these suffers from distortion and attenuation of the signals, and requires amplification. It is noted that the issues for transmit and receive channels are not symmetric, and thus each issue is preferably considered separately. In particular, according to one aspect of the invention, the substantial high speed digital electronics are located distant from the antenna electronics system. Therefore, the receive channel may communicate an analog signal to the remote location. On the other hand, the transmit channel may communicate an analog or digital signal to the antenna electronics system, and advantages accrue if the communication is digital, since attenuation and distortion in the communications medium may be completely corrected; however, this scheme then requires a digital to analog converter operating at the data rate located within the antenna electronics package.

Three options are generally available for a transmit channel: a first option provides an analog signal communicated from the remote electronics station to the antenna electronics system, for power amplification and transmission. In this case, the remote electronics can predistort the signal to compensate for various types of distortion in the downstream electronics chain, though there is limited capability to compensate for intermodulation distortion. Thus, on this embodiment, the various elements of the communication link and transmission-side antenna electronics system should have high linearity.

A second option provides a baseband or intermediate frequency communication link from the remote electronics station, with frequency translation at the antenna electronics system. This option corresponds to a more typical cellular radio system. While employing lower frequency communications between the remote electronics system and antenna electronics system permits use of traditional coaxial cable, such systems have limited bandwidth.

A third option provides a digital communication between the remote electronics and the antenna electronics system. In this embodiment, we presume that the high speed digital electronics processing capabilities are not available in the antenna electronics system (though in some cases, they are, avoiding the need for significant communications between the modules), and therefore a fully processed, digital stream which is oversampled with respect to the radio frequency signal to be emitted from the antenna, and thus the antenna electronics system need only convert the digital stream into a corresponding signal, either before, during or after amplification. For example, the digital stream may be communicated through an optic fiber link, and converted from a digitally modulated optic signal to digital pulses. The digital pulses, if oversampled, may then be low pass filtered to produce an analog radio frequency waveform, which may then be amplified by an analog power amplifier.

According to another scheme, the digital stream may be communicated through an optic fiber link, and converted from a digitally modulated optic signal to digital pulses. The digital pulses are then used to drive a power digital-to-analog converter, which produces a high power, e.g., 10 Watt, analog radio frequency signal from the digital stream. In this case, a multibit digital signal may be provided, thus reducing the degree of oversampling required for high fidelity, and potentially facilitating the high power digital to analog converter operation. Thus, in contrast to an ideal digital to analog converter, the slew rate of the converter may be limited, thus permitting the higher order bit drivers, which correspond to higher power, to switch slower than the lower order bits, which correspond to lower power. Indeed, since the characteristics of the power digital to analog converter may be known by the remote electronics system, certain non-idealities may be precompensated. Based on the availability of precompensation, a matched power digital to analog converter may be provided such that the available compensation better matches the distortion. Thus, for example, a 4 bit dynamic range converter may have 5 or more digital input signals. In this way, cost and/or power consumption or other operating characteristics may be optimized.

As will be discussed further below, one or more upstream channels may be provided from the antenna electronics system to the remote electronics system. A principal application is for communication of a representation of a received radio frequency signal or signals. However, a feedback signal, such as a representation of the power amplified radio frequency signal transmitted or to be transmitted by the antenna may be returned to the remote electronics system, thus permitting a feedback-controlled pre-compensation of the signal communicated to the antenna electronics system, or more generally, an adaptive system capable of responding to changes in the system or environment to control the system operation. Thus, operating temperature may affect the output of the antenna electronics system. Internal temperature compensation may be provided, as a known option. On the other hand, temperature compensation (and other types of compensation) may be absent in the power amplification system, and these functions implemented digitally in the remote electronics system. This, in turn, permits, for example, a more efficient and/or less expensive power electronics design, and indeed potentially permits use of a power electronics module which requires under all or substantially all operating conditions, precompensation of the signal in order to produce a usable output signal.

In accordance with an aspect of the technology, the distortion, measured as a Digital Noise Power Ratio (DNPR) of the transmitted signal, defined as the maximum RMS distortion amplitude of the output within a narrow range, e.g., 1 kHz (yielding a $DNPR_{1\ kHz}$), over the entire bandwidth of a band, with respect to the RMS amplitude of a white noise signal with uniform RMS amplitude, extending over the entire band presented at the input, when measured over an arbitrarily long duration. The measurement may be made, for example, by digitizing the output and comparing it to the input with a digital signal processor, and therefore without requiring real filter implementations applied to the input or output signals. Typically, the effects of phase delay and group delay are excluded, and thus the distortion measurements are delay compensated, for example by use of an autocorrelator. Of course, the range of measurement can vary in accordance with the application. Typically, a transmitter system according to a preferred embodiment will provide a $DNPR_{1\ kHz}$ of larger than 40 dB over a bandwidth of 120 MHz, e.g., from 2.4-2.52 GHz, more preferably larger than 50 dB, and perhaps extending up to 96 dB or greater.

The present technology also provides a receiver system. In this case, a radio frequency receiver will comprise an antenna or input from an antenna, a low noise amplifier, which may be cooled, for example <100K, and indeed, may be associated with high temperature superconductor filters operating at <78K, though will typically not be low temperature superconductor components. The signal from the low noise amplifier may drive an electrooptic converter, to thereby communicate an optical signal modulated with an analog radio frequency waveform, at its native radio frequency, to a remote location. As discussed above, this same optic link system, or a corresponding optic link, may also carry feedback signals, such as may be used to control over a transmitter system.

A receiver system in accordance with this embodiment does not require frequency translation components, and thus no mixer is used. Therefore, the level of spurious intermodulation components generated by the receiver may be minimized. Further, by ensuring that the pattern of intermodulation components with significant power within the band is relatively simple, digital deconvolution can be employed, if necessary. Digital deconvolution may also be employed in the receiver system to compensate for distortion in the corresponding signal transmitter. It is thus important to realize that while most radio systems treat intermodulation distortion as noise, and thus additive to the noise floor, these signal components are not stochastic, and to some extent that distortion can be reversed, in contrast to stochastic noise, which is truly random.

The optic link conveys the signal to the remote location, where an ultra-high speed analog-to-digital converter operates to digitize the radio frequency signal at its native frequency. In such a system, the SFDR can reach >90 dB (1 Hz bandwidth), even for wideband applications, from antenna to analog-to-digital converter, an amplified fiber optic link has an SFDR of, for example, >106 dB (in 1 Hz). The analog-to-digital converter and associated elements have, for example, an SFDR of −98.5 dBc over a 39 MHz bandwidth for a 20 GHz signal.

Other architectures may be used for the receiver as well, for example with the analog-to-digital converter located proximate to the antenna, frequency down-conversion, and the like.

A radio system is therefore provided, comprising an optoelectronic receiver adapted to receive an input from an optic communication medium comprising a digital domain representation of a radio frequency signal at a radio frequency data rate of at least 1.4 GHz; a converter adapted to receive a digital electronic signal from the optoelectronic receiver and convert the digital domain representation of the radio frequency signal into an analog domain radio frequency signal of at least 700 MHz; and an interface to an antenna adapted to transmit the radio frequency signal. It is noted that the 700 MHz band, which nominally begins at 698 MHz, is intended for new radio frequency mobile services, such as "Long Term Evolution" (LTE). The system, of course, may operate at higher frequencies, and for example, the converter, and other high speed digital electronic circuitry may operate at up to 40 gigasamples per second, or higher, permitting direct synthesis, without analog up-conversion, of signals of up to 20 GHz, or higher, and at lower frequencies, provides for greater oversampling opportunity. For example, the bands covered notably include the 700 MHz band, the 900 MHz band, 1.2-1.5 GHz bands, 1.8-1.9 GHz bands, 2.4-2.5 GHz bands, and the like. By avoiding analog mixers, a significant source of intermodulation distortion is avoided, thus permitting operation with a high spur free dynamic range. The interface may thus produce the analog domain radio frequency signal corresponding to the digital domain representation signal having a spur-free dynamic range of at least 40 dB over a bandwidth of at least 19 MHz. This 19 MHz represents, for example, a band having a band spacing of 20 MHz with a 0.5 MHz guard band on each side. Because the guard band does not generally include information signals, it may be acceptable for some intermodulation products or other spurious radiation to be present, though regulations typically control such emissions. Where a set of contiguous bands are combined, the entire block of frequencies may be treated as a single information signal.

The optoelectronic receiver and/or transmitter may comprise a multiplex transmitter and/or receiver, adapted to extract and/or inject information modulated on one of a plurality of information-carrying channels of the optic communication medium, substantially without interference with another of the information-carrying channels of the optic communication medium. For example the optic communication may be wavelength division multiplexed. In some cases, a digital signal is communicated on the optic communication medium, e.g., fiber optic, and various digital multiplexing schemes may be employed.

The converter, and other components may have an associated intermodulation distortion of the analog domain radio frequency signal and the digital domain representation of the radio frequency signal may be predistorted in a manner to compensate for at least a portion of the associated intermodulation distortion, to increase an effective spur-free dynamic range of the radio system. The predistortion may be adapted to improve the effective spur-free dynamic range by at least 3 dB, and more preferably by at least 6 dB. Larger degrees of reduction may be possible.

The system may further have an interface to an antenna adapted to receive a radio frequency signal of at least 700 MHz; a low noise amplifier and filter adapted to amplify the received radio frequency signal within a band; and an electrooptic transmitter adapted to transmit a signal corresponding to the received radio frequency signal within a band.

The converter may have an associated intermodulation distortion of the analog domain radio frequency signal and the digital domain representation of the radio frequency signal may predistorted in a manner compensate for at least a portion of the associated intermodulation distortion, to reduce an effective amplitude of at least one intermodulation product present in the analog domain radio frequency signal by at least 3 dB, and more preferably, by 6 dB. The system may further comprise an interface to an antenna adapted to receive, amplify and filter a received radio frequency signal; and an electrooptic converter adapted to generate an optic signal corresponding to the received radio frequency signal. A digital processor may be provided, adapted to increase an effective spur-free dynamic range of the received radio frequency signal by at least 3 dB, or at least 6 dB. Likewise, a digital processor may be provided, adapted to predistort the digital domain representation to increase an effective spur-free dynamic range of the analog domain radio frequency signal by at least 3 dB or at least 6 dB. The digital processor may comprise at least two Josephson junctions, and thus be part of a superconducting electronic circuit, such as a set of logic gates.

A radio system is also provided, comprising an optoelectronic receiver adapted to receive a signal from an optic communication medium comprising a radio frequency signal having at least one significant information-bearing component having a frequency of at least 698 MHz, and ranging, for example, from the 700 MHz band to the X band (7-12.5 GHz); an amplifier adapted to amplify the signal and generate a power radio frequency signal, substantially without frequency translation; and an interface to an antenna adapted to emit the power radio frequency signal, wherein the signal is predistorted to increase an effective spur-free dynamic range of the power radio frequency signal by at least 3 dB, and preferably at least 6 dB, by reducing a power of at least one intermodulation signal with respect to a corresponding signal absent predistortion. A transmitter may be provided, adapted to communicate a feedback signal corresponding to the power radio frequency signal, wherein the predistortion is based on at least the feedback signal. The power radio frequency signal is preferably generated with has a spur-free dynamic range of at least 40 dB over a bandwidth of at least 19 MHz, and preferably over 39 MHz, 59 MHz, or larger bandwidth. Likewise, the spur free dynamic range may be greater than 40 dB, and for example, may be 45 dB or more. The signal may have at least one significant information-bearing component having a frequency of at least 1.5 GHz, for example 1.8 GHz or 2.4 GHz.

The amplifier may comprise a power digital to analog converter, which directly generates an analog radio frequency signal from the at least one significant information-bearing component, having an amplitude of at least 27 dBm, and wherein the power radio frequency signal has an average power of at least 30 dBm.

The radio system may further comprise an interface to an antenna adapted to receive a radio frequency signal of at least 698 MHz; a low noise amplifier and filter adapted to amplify and filter the received radio frequency signal; and an electrooptic transmitter adapted to transmit a signal corresponding to the amplified and filtered received radio frequency signal.

A digital processor may be provided, adapted to predistort the signal to increase an effective spur-free dynamic range of the power radio frequency signal by reducing a power of at least one intermodulation product. Preferably, a largest amplitude intermodulation product (spur) is reduced in amplitude, but this is not always the case. Likewise, preferably the amplitude of a plurality of intermodulation products is reduced.

A radio transmitter is also provided, comprising an optoelectronic receiver adapted to receive an input from an optic communication medium comprising a digital domain representation of a radio frequency signal at a bit rate exceeding 2 Gigasamples per second and produce a digital electronic signal therefrom; a converter adapted to receive the digital electronic signal from the optoelectronic receiver and produce an information-bearing analog domain radio frequency signal of at least 1 GHz, substantially without frequency translation of the digital domain representation; and an interface to an antenna adapted to emit the radio frequency signal.

A radio system is further provided, comprising a receiver adapted to receive an input from a communication medium comprising a discrete time, quantized amplitude modulated representation of a signal, at an intersymbol modulation rate exceeding 2 giga-symbols per second; a converter adapted to receive the signal from the receiver and convert the signal into an analog domain radio frequency signal of at least 698 MHz, for example, greater than 1.5 GHz or 2.4 GHz and a bandwidth of at least 59 MHz; and an interface to an antenna adapted to emit the radio frequency signal, wherein the analog domain radio frequency signal has intermodulation products not expressly defined by the signal having an amplitude of at least −40 dB with respect to the signal; and a digital predistorter adapted to precompensate the input to reduce an amplitude of at least one intermodulation product by at least 3 dB, and preferably by at least 6 dB.

A wideband radio receiver is also provided, comprising at least one tower unit mounted on a tower, each tower unit comprising an antenna adapted to receive an incident wideband frequency distribution radio signal, an amplifier adapted to amplify the wideband frequency distribution radio signal, and an electro-optic converter adapted to convert the amplified wideband frequency distribution to an analog optical signal; an optical fiber communications link adapted to communicate the analog optical signal; and a base unit remote from the tower, adapted to receive the analog optical signal from the optical fiber communications link, comprising an opto-electric converter adapted to convert the optical signal received from the optical fiber link to an analog radio signal with a wideband frequency distribution corresponding to the wideband frequency distribution of the signal incident on the antenna, an analog-to-digital converter adapted to directly digitizes the entire wideband distribution, and a digital linearizer, adapted to digitally compensate the digitized wideband distribution for at least nonlinear distortion, to substantially reconstruct a digitally sampled equivalent of the frequency distribution of the signal incident on the antenna, having a spur-free dynamic range greater than a spur-free dynamic range of the optical signal.

A system is also provided for extracting information from a radio frequency signal, comprising: an input adapted to receive a radio frequency signal comprising information and significant radio frequency energy above 698 MHz; an amplifier adapted to amplify the radio frequency signal, wherein a bandwidth of the radio frequency signal comprising information is at least 19 MHz, and for example, 39 MHz, 59 MHz, 79 MHz, 100 MHz, 120 MHz, or larger bandwidth; an analog communication system having a communication length in excess of 1 meter, adapted to convey the amplified radio frequency signal, wherein the conveyed radio frequency signal has an associated distortion with respect to the radio frequency signal; a digitizer having a sampling rate in excess of 2 GHz, for example 10 GHz, 20 GHz or 40 GHz, adapted to digitize entire bandwidth of the conveyed radio frequency signal; and a digital signal processor adapted to correct at least a portion of the associated distortion, operating on the digitized conveyed radio frequency signal from the digitizer having a sampling rate in excess of 2 GHz.

A radio system is further provided, comprising: an optoelectronic receiver adapted to receive an input from an optic communication medium comprising a radio frequency signal having a bandwidth of at least 59 MHz at a band frequency higher that 698 MHz; an amplifier adapted to generate a power radio frequency signal corresponding to the radio frequency signal having an average power of at least 36 dBm (~4 watts), and for example having an average power of at least 40 dBm (10 watts); and an interface to an antenna adapted to transmit the power radio frequency signal, wherein the power radio frequency signal has a distortion with an error vector magnitude of at least 1% with respect to the radio frequency signal communicated by the optical communication medium. A digital signal processor may be provided, for example, clocked at least 5 GHz, and for example at 10 GHz, 20 GHz, 40 GHz, or faster, adapted to precompensate a digital data stream representing the radio frequency signal for at least a portion of the distortion. The error vector magnitude of the distortion may be, for example, at least 2% or at least 4%, and further comprising a digital signal processor adapted to precompensate a digital data stream representing the radio frequency signal to achieve a reduction in distortion of at least 3 dB, and preferably by at least 6 dB. For example, the error vector magnitude of the distortion is at least 4% and a digital signal processor is provided adapted to precompensate the radio frequency signal to achieve a reduction in error vector magnitude of at least 3%.

This compensation capability (predistortion) therefore allows the use of lower cost, lower power, higher power efficiency, or other advantageous types of devices, which may be mounted, for example, on an antenna tower.

A radio system is further provided, comprising a digital signal processor adapted to process a digital signal representing information to be communicated through a radio frequency transmission having a significant frequency component exceeding 698 MHz, having at least one input for receiving information, at least one logic unit adapted to define digital codes representing a modulated radio frequency signal oversampled with respect to the radio frequency transmission, and at least one digital logic unit adapted to produce a processed representation of the defined digital codes, by at least one of:

(a) predistorting the defined digital codes to increase a spur free dynamic range of the radio frequency transmission, based on a predicted non-linear distortion of a radio frequency transmitter;

(b) combining at least two sets of defined digital codes, each being oversampled with respect to a radio frequency transmission frequency in excess of 698 MHz;

(c) processing a signal representing at least one set of defined digital codes to reduce a peak to average power ratio of the radio frequency transmission after conversion to an analog radio frequency signal;

(d) processing the defined digital codes to provide source-encoding of a set of signals for driving a multiple antenna array, wherein preferably at least two antennas of the multiple antenna array receive respectively different signals; and an output, adapted to present the processed representation.

The at least one digital logic unit may perform any two, or all three functions, in addition to other functions, in any order.

An optoelectronic modulator may be provided, adapted to communicate the output through an optic communication medium. A digital to analog converter may be provided, adapted to convert the defined digital codes into an analog radio frequency signal. Likewise, both a digital to analog converter adapted to convert the defined digital codes into an analog radio frequency signal, and an optoelectronic modulator adapted to communicate the analog radio frequency signal through an optic communication medium may be provided. The radio system may further comprise an optoelectronic demodulator, and a power amplifier to amplify the analog radio frequency signal to a power of at least 27 dBm, wherein the defined digital codes are predistorted to reduce an effect of a non-linear distortion of at least the optoelectronic modulator, optic communication medium, the optoelectronic demodulator, and the power amplifier. An optoelectronic modulator may be provided, adapted to communicate the output as a digital communication through an optic communication medium, an optoelectronic demodulator adapted to produce a communicated digital signal representing the output at a remote location from the optoelectronic modulator, and a digital to analog converter adapted to convert the communicated digital signal representing the output into an analog radio frequency signal. The analog radio frequency signal may be provided with a power of at least 27 dBm, and wherein the defined digital codes are predistorted to increase a spur free dynamic range of the radio frequency transmission, to reduce an effect of a non-linear distortion of the analog radio frequency signal. The defined digital codes may be processed to reduce a peak to average power ratio by at least 1 dB, and for example, 1.5 dB, 2 dB, 2.5 dB, or 3 dB. For example, at least two sets of defined digital codes are combined, and the combined sets of digital codes are processed to reduce a peak to average power ratio by at least 1 dB. The output may presents the processed representation an analog domain radio frequency signal having a spur-free dynamic range of at least 40 dB over a bandwidth of at least 19 MHz.

The digital logic unit may comprise at least one look-up table responding to look-up requests at a rate of at least 698 megasamples per second, and may provide a plurality of look-up tables operating in tandem, for example to implement a proportional-integral-differential processing algorithm in conjunction with a delay logic device, an integrator logic device, and a differentiator logic device.

The radio system may further comprise a digital crosspoint switch matrix. The radio system may further comprise a first optoelectronic modulator adapted to generate an optical communication of the output; an interface to an antenna adapted to receive a radio frequency signal of at least 698 MHz; and a second optoelectronic modulator adapted to optically communicate a signal corresponding to the received radio frequency signal. The defined digital codes may be processed by the digital logic unit to reduce an amplitude of at least one intermodulation product by at least 3 dB, preferably by at least 6 dB, based on a digital model of a non-linear process operating on the output. The digital signal processor may comprise an input adapted to receive a feedback signal representing a distorted of the output, and wherein the predistortion is responsive to the feedback signal. The digital signal processor comprises at least two Josephson junctions. Likewise, the digital signal processor may comprise an active superconducting logical device.

The output may represents at least one significant information-bearing component having a frequency of at least, for example, 1.0 GHz, or 1.5 GHz, or 2.0 GHz, or 3 GHz, or higher.

The radio system may further comprise an optoelectronic transmitter adapted to communicate the output as a signal in an optic communication medium; an optoelectronic receiver adapted to receive the signal from the optic communication medium comprising information defining a radio frequency signal having at least one significant information-bearing component having a frequency of at least 698 MHz; an amplifier adapted to amplify the signal and generate a power radio frequency signal, substantially without frequency translation; and an interface to an antenna adapted to emit the power radio frequency signal, wherein the signal is predistorted to increase an effective spur-free dynamic range of the power radio frequency signal by reducing a power of at least one intermodulation signal with respect to a corresponding signal absent the predistortion. A transmitter may be provided, adapted to communicate a feedback signal corresponding to the power radio frequency signal to the digital signal processor, wherein the predistortion is based on at least the feedback signal. The power radio frequency signal may have a spur-free dynamic range of at least 40 dB over a bandwidth of at least 19 MHz, and for example over a bandwidth of 39 MHz or 59 MHz. The amplifier may comprise a power digital to analog converter, which directly generates an analog radio frequency signal from the at least one significant information-bearing component, having an amplitude of at least 27 dBm, and wherein the power radio frequency signal has an average power of at least 30 dBm. The predistortion preferably improves the effective spur-free dynamic range by at least 3 dB, and more preferably by at least 6 dB.

A radio transmitter is provided, comprising a digital signal processor adapted to produce a digital domain representation of a radio frequency signal, sampled at a rate of at least 1.5 gigasamples per second; an optoelectronic transmitter adapted to communicate over an optic communication medium the digital domain representation of a radio frequency signal at a rate of at least 1.5 gigasamples per second; an optoelectronic receiver adapted to receive an input from the optic communication medium and produce a digital electronic signal therefrom; a converter adapted to receive the digital electronic signal from the optoelectronic receiver and produce an information-bearing analog domain radio frequency signal having significant frequency components exceeding 698 MHz; and an interface to an antenna adapted to emit the radio frequency signal.

The digital signal processor may be adapted to process a digital signal representing information to be communicated through a radio frequency transmission having a significant frequency component exceeding 698 MHz, having at least one input for receiving information, at least one logic unit adapted to define digital codes representing a modulated radio frequency signal oversampled with respect to the radio frequency transmission, and at least one digital logic unit adapted to produce a processed representation of the defined digital codes, by at least one of:

(a) predistorting the defined digital codes to increase a spur free dynamic range of the radio frequency transmission, based on a predicted non-linear distortion of a radio frequency transmitter;

(b) combining at least two sets of defined digital codes, each being oversampled with respect to a radio frequency transmission frequency in excess of 698 MHz;

(c) processing a signal representing at least one set of defined digital codes to reduce a peak to average power ratio of the radio frequency transmission after conversion to an analog radio frequency signal; and (d) processing the defined digital codes to provide source-encoding of a set of signals for driving a multiple antenna array, wherein preferably at least two antennas of the multiple antenna array receive respectively different signals.

The at least one digital logic unit may perform any two, or all three, functions, in any order, in addition to other functions.

A power amplifier may be provided, adapted to amplify the analog radio frequency signal to a power of at least 27 dBm, wherein the digital signal processor predistorts the digital domain representation to reduce an effect of a non-linear distortion of at least the power amplifier.

The digital signal processor may predistort the digital domain representation to increase a spur free dynamic range of the radio frequency signal by at least 3 dB, and preferably at least 6 dB.

The defined digital codes may be processed to reduce a peak to average power ratio by at least 1.0 dB, 1.5, 2.0 dB, 2.5 dB, or 3 dB. At least two sets of defined digital codes may be combined, and the combined sets of digital codes are processed to reduce a peak to average power ratio by at least 1 dB, 1.5, 2.0 dB, 2.5 dB, or 3 dB.

The radio frequency signal may have, for example, a spur-free dynamic range of at least 40 dB over a bandwidth of at least 19 MHz, and preferably over 39 MHz or 59 MHz.

The defined digital codes may be processed by the digital logic unit to reduce an amplitude of at least one intermodulation product by at least 3 dB, preferably by at least 6 dB, based on a digital model of a non-linear process operating on the analog domain radio frequency signal.

The digital signal processor may have an input adapted to receive a feedback signal representing a distorted of the output, and wherein the predistortion is responsive to the feedback signal.

The digital signal processor may comprise an active superconducting logical device, such as a device implemented using Josephson junctions.

The radio frequency signal may be generated by a power digital to analog converter, which directly generates an analog radio frequency signal from the at least one significant information-bearing component, having an amplitude of at least 27 dBm, and wherein the power radio frequency signal has an average power of at least 30 dBm.

The radio frequency signal may have intermodulation products not expressly defined by the digital signal processor having an amplitude of at least −40 dB with respect to the radio frequency signal in the absence of predistortion, and the digital signal processor predistorts the digital domain representation of the radio frequency signal to reduce an amplitude of at least one intermodulation product by at least 3 dB.

The digital signal processor may comprise at least one look-up table, and may provide a plurality of look-up tables operating in tandem. The digital signal processor may, for example, comprise a delay element signal path, an integrator element signal path, and a differentiator element signal path, each signal path having at least one corresponding look-up table, and a combiner receiving an output of each respective signal path, to define a transformation of the digital domain representation of the radio frequency signal.

A radio system is further provided, comprising an optoelectronic receiver adapted to receive an input from an optic communication medium comprising an analog domain representation of a radio frequency signal having a frequency of at least 698 MHz; a converter adapted to digitize the analog domain representation at a sampling rate of at least 1.4 gigasamples per second; and a digital signal processor adapted to reduce an effective intermodulation distortion inferred to be present in the digitized analog domain representation based on strong signal components present in the digitized analog domain representation and their respective likely intermodulation products. The digital signal processor analyzes a frequency band greater than about 20 MHz, for example, 40 MHz, 60 MHz, 80 MHz, 100 MHz or 120 MHz. The digital signal processor preferably produces a representation of the analog domain radio frequency signal having a spur-free dynamic range of at least 40 dB over a bandwidth of at least 19 MHz, or 39 MHz, or 59 MHz. The digital signal processor preferably improves the effective spur-free dynamic range of the digitized analog domain representation by at least 3 dB, more preferably by at least 6 dB.

The radio system may further comprise an interface to an antenna adapted to receive a radio frequency signal of at least 700 MHz; and an electrooptic transmitter adapted to transmit a signal corresponding to the received radio frequency signal within the band on the optic communication medium.

The digital processor may be adapted to deconvolve a non-linear distortion of the digitized analog domain representation. Similarly, the digital processor may be adapted to reverse a non-linear distortion of the digitized analog domain representation, said digital signal processor comprising at least one look-up table, and for example may comprise a plurality of look-up tables operating in tandem. The digital processor may further comprise a delay element signal path, an integrator element signal path, and a differentiator element signal path, each signal path having at least one corresponding look-up table, and a combiner receiving an output of each respective signal path, to define a transformation of the digitized analog domain representation of the radio frequency signal.

The radio system preferably is implemented using superconducting digital electronic logic elements, and for example, the converter and/or digital signal processor may comprise at least one active superconductive electronic device. The converter may digitize the analog domain radio frequency signal at a rate of at least 5 gigasamples per second (GSPS), for example 10 GSPS, 20 GSPS or 40 GSPS.

A digital signal processor is provided, comprising an superconducting electronic circuit receiving as an input a digital signal having at least two radio frequency components having a center frequency above 698 MHz, representing an analog signal having information represented as signal energy within a band, and being subject to non-linear distortion, wherein the input further comprises at least one intermodulation product of the at least two radio frequency components present within the band, said superconducting circuit processing the input to reduce a signal energy within the band resulting from intermodulation distortion by at least 3 dB with respect to signal energy corresponding to information, and an output representing at least a portion of the information. The superconducting electronic circuit may comprises at least one look-up table, and for example may comprise a plurality of lookup tables. The superconducting electronic circuit may further comprise a digital correlator, which may be, for example, a multi-bit autocorrelator. The digital signal processor may further comprise a crosspoint switch matrix, and/or a digital channelizer.

A radio system is provided, comprising a receiver adapted to receive an input from a communication medium comprising radio frequency signal; a converter adapted to digitize the signal at a rate of at least 1.4 Gigasamples per second to digitally describe a radio frequency waveform having frequency components of at least 698 MHz and a bandwidth of at least 59 MHz; wherein the digitized signal has intermodulation products represented therein having an amplitude of at least −40 dB with respect to the signal; and a digital predistorter adapted to precompensate the input to reduce an amplitude of at least one intermodulation product by at least 3 dB.

These and other objects will become apparent through review of the detailed description and drawings.

BRIEF DESCRIPTION OF THE DRAWINGS

FIG. 1 shows an exemplary block diagram of a transceiver system of the prior art.

FIG. 2 shows a block diagram of a transceiver system according to the present invention.

FIG. 3 shows a block diagram of a preferred embodiment of a transceiver system according to the present invention, with superconducting digital electronics mounted on a cryo-cooler.

FIG. 4 shows a detailed block diagram of a multichannel transceiver according to the present invention, showing multiple signals and multiple antennas.

FIG. 5 shows a detailed block diagram of a transmitter according to the present invention, showing an alternative optical link.

FIG. 6 shows a block diagram of a distorter with proportional, integral, and differential control, that can compensate for nonlinear distortion in amplifiers and optical links, according to the present invention.

DETAILED DESCRIPTION OF THE PREFERRED EMBODIMENTS

A block diagram of a modern wireless basestation of the prior art is shown in FIG. 1. This describes a split architecture, which is partitioned into digital baseband (DBB) processing on the ground (i.e., within a base station module) and analog RF processing on the tower. A version of in-phase and quadrature (IQ) receiver and transmitter are shown here, although other variants known in the art may alternatively be applied. Thus, it should be understood that FIG. 1 is simplified, and, for example, portions of the electronics may be duplicated.

Consider first the transmitter, where the DBB Synthesizer might, for example, generate an OFDM (orthogonal frequency domain multiplexed) signal that is up to a few MHz in bandwidth, comprising many narrow band signals, properly timed and encoded. This digital signal is then used to modulate a diode laser or optical interferometer, and the optical signal is coupled into an optical fiber that is sent up the tower. Optical fibers generally exhibit relatively weak attenuation; the choice of fiber would depend on the distance to be covered, which could be quite far in some cases. The digital optical signal is demodulated at the tower, typically with a photodiode, and the resulting digital electrical signal recovers the initial DBB signal. This is then sent to a standard digital-to-analog converter (DAC) to obtain the analog baseband signal, which is then combined with an RF local oscillator in a mixer (with both I and Q signals in the standard way) to upconvert the signal and generate a low-power version of the signal to be transmitted. This passes through an appropriate bandpass filter (BPF), is amplified in a power amplifier (PA), and broadcast through an antenna. In typical wireless systems, the same antenna is used alternately for both transmission and reception, with a duplexer to isolate the two systems.

The prior-art receiver system in FIG. 1 goes through the reverse transformations. The very weak received RF signal received through the antenna is first filtered and amplified (using a low-noise amplifier or LNA), and then downconverted, generating I and Q baseband signals. These are then digitized at or above the Nyquist rate, and modulate a diode laser or interferometer. The resulting optical signal is sent off the tower toward the ground station via optical fiber. After regeneration of the electrical digital baseband signal, the digital baseband processor decodes and reconstructs the individual sub-channels (channelization) which are then sent along to the user.

The Prior Art IQ Transceiver shown in FIG. 1 includes a Transmitter 24 and a Receiver 25. The Transmitter starts with a Base Unit located on the Ground 22, with Digital Baseband Synthesizer 1, which sends in-phase (I) and quadrature (Q) digital baseband signals to Digital Electro-optic (E/O) Modulators 2. The E/O Modulator transmits I and Q digital optical signals at 1-10 MS/s over Optical Fiber 21 to the Tower Unit 23. These digital optical signals are demodulated in Digital Opto-electronic demodulator 3, which regenerates I and Q digital baseband signals, each of which is sent to a respective baseband Digital-to-Analog Converter (DAC) 4. The resulting I and Q analog signals are each sent to a respective analog mixer (Upconverter 5), where they are combined with the output of a Local Oscillator (LO 20), with a 90 degree phase shift applied to the input to the mixer for the Q signal. The outputs of the upconverters are then sent to a Bandpass Filter 6, and then combined in an analog combiner (Adder 7) to generate the RF signal to be amplified and transmitted. This analog signal is sent to the Power Amplifier (PA 8), and the PA output is sent to the Duplexer 10, and then to the Antenna 9 for broadcasting.

FIG. 1 further shows that the Receiver 25 receives a weak RF signal from the Antenna 9 on the Tower 23 (when the antenna is not transmitting), and sends it to the Duplexer 10, and then to the Bandpass Filter 11. The filtered analog signal is then passed to a Low Noise Amplifier LNA 12, and then split in an analog splitter, with RF signals going to the I and Q receive channels. Each of these is input to a mixer (Downconverter 14), where it is combined with the output of a Local Oscillator 19, with the appropriate 90 degree phase shift for the Q channel. The output of the downconverter is digitized by a baseband Analog-to-Digital Converter 15 to generate I and Q digital baseband signals, which are then converted to digital optical signals in Electro-Optic modulator 16, and sent over Optical Fibers 21 to the Ground Unit 22. These signal are received at the ground unit by Digital opto-electronic (O/E) receivers 17, and demodulated to obtain the baseband digital signals, which are sent in turn to Digital Baseband Channelizers 18 for recovery of the signals of interest.

The system of FIG. 1 is well established and reasonably efficient, but has some serious shortcomings with respect to future evolution of cellular communications, and communications in general. A key problem is that the demand for greater bandwidth requires the use of wider channels and additional bands. That is, the information for a single communication is spread over a broader range of frequencies within a channel, and the various channels are located over a broad range of spectrum in various bands. Likewise, the same bands may not be available at all locations for use, but the required economies of scale suggest a single hardware design for multiple installations, without the need for customization. One approach is simply to place more transceiver systems on the towers, but the size, weight, and power consumption of all of these is becoming impractical. For example, a key consideration in tall tower construction is wind load factors, which is influenced by the size and weight of components mounted on the tower. As the size and weight increase, the tower structure must be correspondingly increased, leading to increased costs, and in some cases, zoning or aesthetic restrictions. Alternatively, one may combine multiple baseband signals into a single broader frequency band, thereby reducing the number of components. However, this requires not only faster digital processing, but also wider-band analog mixers and PAs. The required PA in particular is a significant impediment, since increasing the bandwidth tends to increase the nonlinearity. Nonlinearity generates intermodulation products, which in turn limit the useful dynamic range of the system, creating interference and bit errors. There are well known approaches for linearizing nonlinear systems, both analog and digital, but these, too, become more difficult as the bandwidth increases.

One aspect of the present invention takes a substantially different approach from the prior art system in FIG. 1. First, as shown in FIG. 2 and FIG. 3, the system partition between the ground (base station) and the tower is quite different from that of the prior art system in FIG. 1. The present system generally provides fewer elements on the tower; specifically, frequency shifting and conversion between analog and digital occur in the base station (e.g., on the ground) rather than in the tower electronics module. Second, the signal being transmitted on optical fiber between the base station and tower electronics module is a broadband analog signal, rather than a narrowband digital signal, with corresponding broadband analog modulators/demodulators at both ends. Third, digital processing in the base station ground is carried out at ultrafast data rates, taking advantage of the extremely high-speed digital processing (10-100 GHz) recently made possible by RSFQ superconducting circuits, though the use of other technologies achieving corresponding performance is possible. Thus, this architecture is not restricted to RSFQ, although RSFQ is presently capable of achieving the required speeds functions and alternative technologies may be unable to achieve the required speeds and functions. And fourth, the present invention may incorporate advanced digital domain linearizing components that also operate at these ultrafast data rates, and enable much broader bandwidths than are feasible using the conventional prior-art transceivers which seek to perform linearization using traditional semiconductor digital processing or analog processing.

FIG. 2 describes the block diagram of one embodiment in accordance with the present invention, of the Digital-RF™ Transceiver, which includes Transmitter 53 and Receiver 52. Transmitter 53 starts on the Ground 55 with a Digital Baseband Synthesizer 31 to generate the digital baseband signal, which is upconverted using Digital Upconverter 32 and Digital Local Oscillator 50 to generate the Digital-RF™ signal, which is a digital domain representation of a radio frequency signal, which is oversampled (i.e., above a Nyquist rate for significant components thereof) with respect to the radio frequency signal, at a data rate that may be 10-100 GS/s. This signal is then subjected to further digital processing in Digital Predistortion Unit 33, before being converted to an RF analog signal in RF DAC 34. This analog RF signal is then input into an Analog Electro-optic (E/O) modulator to generate an analog optical signal which is sent from the Base Unit on the ground to the Tower Unit 54. The optical signal is received by Analog Opto-electronic (O/E) receiver 37, which generates an analog RF electrical signal which is filtered by Bandpass Filter (BPF) 38, then passed to Power Amplifier (PA) 39 to generate the high-power RF signal to be transmitted. After passing through the Duplexer 40, the signal is sent to Antenna 51 for transmission. The various analog components are subject to various kinds of distortion, including intermodulation distortion, which result in intermodulation spurs or power peaks which are not directly defined by the information pattern which leads to the Digital-RF™ signal. The Digital Predistortion Unit 33 precompensates the datastream for the anticipated distortion, and, for example, produces a high-power RF signal which has reduced spurs, and in particular it is preferable to process the information to reduce the largest amplitude spur.

FIG. 2 further describes the components of Receiver 52, which starts on the Tower 54 with a weak RF signal received by Antenna 51 (when the antenna is not transmitting), and sent to Duplexer 40, and then to Bandpass Filter 41, and to Low-Noise Amplifier (LNA) 42. The amplified RF signal is input to the Analog Electro-optic (E/O) modulator which generates an analog optical signal on Optical Fiber 44, which is sent from the Tower to the Base Unit on the Ground 55. This analog optical signal is received by Analog Optoelectronic (O/E) receiver 45, which generates the RF electrical signal which is sent in turn to RF Analog-to-Digital Converter (ADC) 46. The ADC generates a fast Digital-RF™ signal which is subject to further digital processing in Digital Postdostortion Unit 47. This is then combined with the output of Digital Local Oscillator 50 in Digital Downconverter (DDC) 48, the output of which is a baseband frequency digital signal which is sent to Digital Baseband (DBB) Channelizer 49.

Consider the transmitter in FIG. 2 in greater detail. Unlike in FIG. 1, the narrowband digital baseband (DBB) synthesized signal is not converted to analog, but rather is digitally upconverted to a digital-RF signal at a multi-GHz data rate, using a digital LO rather than an analog oscillator. Proper IQ upconversion as in FIG. 1 is implied but not explicitly shown. This digital signal is then processed at a multi-GHz data rate in a digital linearization module operating at radio frequency data rates (described below in FIG. 6) that predistorts for nonlinear distortion in both the optical link and the power amplifier. This linearization module is capable of superior nonlinear compensation (in terms of suppression of intermodulation interference, for example) to that achievable using more conventional digital-baseband predistortion at lower data rates. The predistorted signal is then converted to an analog RF signal using an ultrafast DAC, which may also be implemented in whole or in part, using RSFQ technologies. This RF signal, in the GHz range, then modulates a linear analog optical modulator, and the optical signal is then sent via fiber to the tower electronics module. At the tower, the optical signal is demodulated with a linear analog photodiode, which is then passed through a bandpass filter and then amplified in the PA. It is important to note that although FIG. 2 shows a single DBB signal, it is compatible with multiple DBB signals that can be digitally combined (as shown below in FIG. 5) to form a much broader band signal. Furthermore, FIG. 5 also shows an alternative transmitter embodiment wherein the signal is maintained in digital format through the optical link, as described further below.

For the receiver in FIG. 2, the LNA in the tower electronics module needs to amplify the weak incoming RF signal to a sufficiently high level (which may be up to 10 V in amplitude) to drive the EO Modulator in a linear regime, and the resulting optical signal is sent down to the base station, where it is demodulated. The resulting RF electrical signal is then digitized in an ultrafast digitizer, for example using RSFQ technologies, without prior analog downconversion. This high-rate digital signal is then sent to another linearization module operating a radio frequency data rates, for post-distortion, to correct for nonlinear distortion in both the analog amplifier and analog optical link in the receive chain. Here again, superior linearization can be obtained beyond that achievable using baseband digital processing. The linearization modules for transmit and receive are formally similar, but are separately programmable with specific parameters for the relevant devices in each channel. After linearization, the signal is downconverted using a digital LO (where again IQ processing is implied), to generate a standard baseband signal that can then be further digitally channelized into multiple narrowband digital signals. This implementation is readily compatible with a much broader signal band, so that multiple conventional DBB signals can be recovered via the same broadband receive channel.

FIG. 3 describes a preferred embodiment providing a superconducting active logic (RSFQ) implementation of the Digital-RF™ Transceiver of, focusing on details of the Ground Unit 55 from FIG. 2. The Transmitter 60 starts with Digital Baseband (DBB) Synthesizer 61, which is sent to the RSFQ unit mounted in a Cryocooler 78. The digital baseband signal is then up-sampled in a Digital Interpolation Filter 62, and then combined with fast Digital Local Oscillator (LO) 64 in Digital Mixer 63, functioning as an upconverter. The resulting Digital-RF signal is then subject to further digital processing at radio frequencies in the Digital Predistorter 65, and then converted to the analog domain in RF Digital-to-Analog Converter (DAC) 66. This RSFQ Digital-RF™ signal is then amplified in Pre-Amplifier 67 and sent out of Cryocooler 78 to Analog Electro-optic (E/O) modulator 68, which sends the analog RF signal over optical fiber 69 to Tower Unit 54 in FIG. 2.

FIG. 3 further describes the RSFQ implementation of the Receiver unit 70, focusing on details of the Ground Unit 55 from FIG. 2. This starts with an analog optical signal coming from Tower Unit 54 in FIG. 2 over optical fiber 79, and is received by Analog Opto-electronic (O/E) demodulator 71, which generates an analog RF signal that is sent to the RSFQ circuits in Cryocooler 78. This analog RF signal is first digitized in RF Analog-to-Digital Converter (ADC) 72, and then subjected to further digital processing in Digital Postdistorter 73, the output of which is then sent to Digital Mixer 74, functioning as a digital downconverter, and combined with the output of Digital Local Oscillator 64. The downconverter digital output is sent to Digital Decimation Filter 75, reducing the data rate to the baseband sampling rate. This digital signal is amplified to standard digital levels in Pre-Amplifier 76 and sent out of Cryocooler 78, to Digital Baseband Channelizer 77 for further baseband processing.

This technology employs integrated circuits comprised of many superconducting Josephson junctions, and at present is implemented preferably using niobium (Nb) as the superconductor, operating preferably at temperatures below about 5 K (−268 C). These circuits can be tested in the laboratory in a Dewar filled with liquid helium at a temperature of 4.2 K, but in the field would be mounted on a cryocooler inside an evacuated chamber. This cryocooler is a closed-cycle refrigerator, typically with two or more stages, which may be based on a pulse-tube, Gifford-McMahon, or Stirling cycle, and several models are sold commercially that can operate reliably for extended periods as long as electric power remains available. However, the power and weight budgets for present-day 4K cryocoolers may be too large for placement on a tower, hence a ground-based location in accordance with the present invention is preferable.

It is important to point out that RSFQ data converters (ADCs and DACs) are extremely linear, since they are based on a fundamental physical constant, the single flux quantum $\Phi_0 = h/2e = 2.07$ mV−ps, where h is Planck's constant and e is the charge on the electron. In fact, the international defining standard for the volt is now based on arrays of Josephson junctions, such that a data rate of 100 GHz corresponds to a voltage of 0.207 mV. This high linearity of data conversion is quite attractive for maintaining linearity in a digital receiver or transmitter. However, this linearity will be degraded by nonlinear distortion in the amplifiers and optical converters. Fortunately, the linearity can be restored through the use of appropriate "inverse distortions", also possible using RSFQ circuits.

It should be noted that various technological implementations for the various components are possible, however, if a cryocooler is required for any RSFQ component, the use of additional RSFQ components is generally efficient.

Also shown in FIG. 3 are digital circuits required for digital rate conversion: a digital interpolation filter for up-sampling and a digital decimation filter for down-sampling. These would also be implemented (at least in part) using ultrafast RSFQ circuits. Furthermore, since RSFQ circuits are a very low-power, low-voltage technology, pre-amplifiers are needed to increase the voltage level from ~1 mV to ~1V to interface with external conventional electronics. For the transmitter, this pre-amplifier may be integrated with the DAC, as for example in the published patent application entitled "Multibit Digital Amplifier" (U.S. patent application Ser. No. 12/002,592, expressly incorporated herein by reference). For the receiver, where the digital pre-amplifier interfaces with the DBB channelizer module, efficient, high-gain, nonlinear switching amplifiers could be used, since analog-grade linearity is not required.

The pre-amplifiers and optical converters can operate at standard temperatures, but in some cases the device noise may be reduced by cooling, typically to temperatures above the 4K operating temperature of the RSFQ circuits. Since most 4K cryocoolers are designed with thermal stages at an intermediate temperature of, say, 70 K, integration of these devices with the RSFQ circuits may be directly obtained within a single system having multiple temperature modules. A further advantage may be that optical fibers may be provided that carry less heat into the cryogenic environment than a metallic coaxial line with a similar bandwidth, and thus reduce the heat load on the low temperature portions cryocooler.

Similarly, although the low noise amplifier (LNA) and band pass filter (BPF) of the receiver in FIG. 2, mounted in the tower electronics module, can operate quite well at ambient temperatures, the noise could be further reduced by cooling to temperatures of order 70 K. 70K single-stage cryocoolers are available which are compact, efficient, and very reliable, and may thus be employed. Further, high-performance BPF based on "high-temperature superconductors" (such as $YBa_2Cu_3O_7$, which superconducts below 90 K) are commercially available and will also operate well at 70K. Tower-mounted analog receiver assemblies comprising a 70K cryocooler with a superconductor BPF and a semiconductor LNA are already commercially available, and thus may be employed.

FIG. 4 shows the flexibility of a transceiver in accordance with an embodiment of the present invention which may be applied to a multi-channel, multi-band system, through the use of an RSFQ switch matrix (See, U.S. Pat. No. 7,362,125 and published applications Ser. Nos. 11/966,889, 11/966,897, 11/966,906, and 11/966,918, each of which is expressly incorporated herein by reference). For clarity, this switch matrix is not shown in the optical links of the transceiver.

FIG. 4 describes the block diagram of Digital-RF™ multi-channel, multi-band transceiver, comprised of Receiver 80 and Transmitter 90. FIG. 4 focuses on Ground Unit 55 of FIG. 2, and does not show the details of the Tower Unit 54 or the optical link (35, 36, 37, 43, 44, 45). It is further indicated in FIG. 4 that in one implementation of the Multichannel Transceiver, the Digital-RF™ processing would be carried out in Superconducting Electronics (SCE), and the digital baseband processing would be carried out using more conventional Room-Temperature Electronics (RTE).

The Receiver 80 in FIG. 4 starts with a plurality of m antennas 81 which may receive m RF signals from m bands, each signal being sent to a respective Analog-to-Digital Converter 82. The Digital-RF™ output of each ADC is then sent to an m×n Digital Switch Matrix 83, to generate n digital-RF outputs being sent to n respective Digital Channelizer Units 84. It is noted that m and n need not be equal, and a single antenna signal may be presented to any number of processing devices. Likewise, some antennas may be dormant for more certain periods, and not connected for processing. Typically, the Digital Switch Matrix 83 is not configured to receive multiple inputs from various antennas; however, a processing device, such as a MIMO processor, may have multiple ports on the matrix which allow it to process multiple antenna signals. Each Digital Channelizer Unit comprises a Digital I&Q (In-phase & Quadrature) Downconverter 85 and a Digital I&Q Decimation Filter 86. The Digital Local Oscillator (LO 64 in FIG. 3) is implied but not shown. The Decimation Filter reduces the digital data rate to the baseband sampling rate, and the digital baseband signal is passed to the Baseband Digital Signal Receive Processor 89 for further channelization, demodulation, decoding, despreading, etc. When MIMO technologies are employed, the signals from a plurality of antennas are not treated orthogonally, and must be processed together.

FIG. 4 further describes the Transmitter 90. The Baseband Digital Signal Transmit Processor 99 generates n baseband digital signals, which are passed to n Digital Transmitter Units (DTU) 95. Each DTU is comprised of a Digital I&Q Interpolation Filter 97 (to increase the digital sampling rate) and Digital I&Q Upconverter (with the Digital LO implied but not shown). The resulting n Digital-RF signals are sent to an n×m Digital Switch Matrix 94, and m digital-RF signals are sent to m respective transmit chains. Each transmit chain includes a Digital Predistorter/Digital-to-Analog Converter Unit 93, Power Amplifier 92, and Antenna 91. In the case of MIMO, the Digital-RF™ signals for a plurality of antennas must be coordinated, for example at the level of the Digital Transmitter Units 95.

The antennas for the various bands might be located on the same tower or on different towers. This may also include systems with multi-input, multi-output signals in the same frequency range, known as MIMO. Within the spirit of "software-defined radio" or "cognitive radio", the switch matrix may be dynamically reprogrammed to redistribute signals according to the current traffic and availability of the various bands.

Likewise, more sophisticated antenna systems may be provided, such as electronically steerable antenna arrays, conformal antenna arrays, synthetic aperture antennas, and the like. In particular, the digital and analog processing is not limited to traditional cellular radio implementations.

MIMO systems exploit the spatial separation of antennas operating in the same band and having overlapping native coverage areas to extract or convey information, which can lead to a reduction in interference, increased channel information carrying capacity, or other advantages. Spatial multiplexing is a transmission technique in MIMO wireless communication to transmit independent and separately encoded data signals, called streams, from each of the multiple transmit antennas. Therefore, the space dimension is reused, or multiplexed, more than one time. If the transmitter is equipped with $N_t$ antennas and the receiver has $N_r$ antennas, the maximum spatial multiplexing order (the number of streams) is $N_s = \min(N_t, N_r)$, if a linear receiver is used. This means that $N_s$ streams can be transmitted in parallel, leading to an $N_s$ increase of the spectral efficiency (the number of bits per second and per Hz that can be transmitted over the wireless channel). Therefore, in accordance with the present technology, multiple antennas and mast-mounted electronics modules, with spatial separation and overlapping beam patterns and frequency bands of operation, which in accordance with aspect of the invention may be simplified with respect to generally used electronics modules, are employed. This may be particular advantageous with WiMax (IEEE 802.16), and 3G or later cellular technologies. Typically, the multiple radio frequency signals or their digital representations, are communicated as wavelength division multiplexed (WDM) signals on a single optic fiber, though multiple optic fibers may also be employed. Preferably, the signals are not frequency translated in an analog domain for modulation in a single optic channel, since this frequency translation generally degrades the SFDR and may produce distortion and bandwidth limitations on the signal.

In an open-loop MIMO system with $N_t$ transmitter antennas and $N_r$ receiver antennas, the input-output relationship can be described as $y=Hx+n$, where $x=[x_1, x_2, \ldots, x_{N_t}]^T$ is the $N_t \times 1$ vector of transmitted symbols, y,n are the $N_r \times 1$ vectors of received symbols and noise respectively and H is the $N_r \times N_t$ matrix of channel coefficients. In a closed-loop MIMO system the input-output relationship with a closed-loop approach can be described as $y=HWs+n$, where $s=[s_1, s_2, \ldots, s_{N_s}]^T$ is the $N_s \times 1$ vector of transmitted symbols, y,n are the $N_r \times 1$ vectors of received symbols and noise respectively, H is the $N_r \times N_t$ matrix of channel coefficients and W is the $N_t \times N_s$ linear precoding matrix.

A precoding matrix W is used to precode the symbols in the vector to enhance the performance. The column dimension $N_s$ of W can be selected smaller than $N_t$ which is useful if the system requires $N_s (\neq N_t)$ streams because of several reasons, for example, if either the rank of the MIMO channel or the number of receiver antennas is smaller than the number of transmit antennas.

Preferably, these transformations may be performed by the digital signal processor processing the information at radio frequency sample rates, thus avoiding introduction of distortion due to analog downconversion or the like. In the transmit signal processing, the digital signal processor may perform a beamforming operation to control a radiation pattern of a set of common information transmitted by a plurality of antennas, this increasing an effective signal power in spatial regions of interest, while reducing an effective signal power where it is not needed. Likewise, the transmitted signals may be precoded with different information patterns on different antennas, especially in a multi-user environment (e.g., multiple remote or mobile receivers receiving information from a central antenna array). The receiver's task typically involves, in part, a beamforming task, as well as compensation for multipath effects and possible other distortions, through a plurality of antennas having overlapping native beam patterns and common operating frequency band. The MIMO processing therefore involves compensation for delay, matrix transformation, signal correlation and autocorrelation (e.g., for multipath echo detection and processing) and the like. These functions are each available in high speed digital processors, such as RSFQ circuits. See, e.g., U.S. Pat. No. 7,440,490, expressly incorporated herein by reference. See also, Wikipedia.

To achieve MIMO from a conventional system, several technologies are available:

Beamforming is known as antenna array signal processing, where every antenna elements are separated from its nearest element by half of the transmit signal wavelength.

Space-Time Coding/Space-Time Processing performs antenna diversity with multiple antennas at either transmitter or receiver side or both sides, where every antenna elements are separated from its nearest element by around 4 to 10 times the wavelength to keep the signal through each multi-path independent. The distance between two adjacent antenna elements is relying on the angular spread of the beam signal.

SDMA is a common and typical multiple input multiple output scheme in cellular wireless systems. SDMA is often referred to as simply a MIMO system since the half port of a SDMA system also consists of multiple users.

Spatial multiplexing is performed by multiple antennas equipped at both a transmitter and a receiver front end.

Cooperation are known as network MIMO systems, distributed MIMO systems or virtual antenna array systems. Mobile devices use the partnered mobile devices' antennas, antenna arrays, or antenna elements as virtual antennas.

Combinations of above techniques, etc.

use an existing techniques with enhanced PHY capabilities, e.g., a 16×16 array configuration.

use special MIMO algorithms such as precoding or multi-user scheduling at the transmitter.

cooperative antenna MIMO.

virtual antenna MIMO.

Intelligent spatial processing, e.g., RADAR beamforming.

Multi-user MIMO can leverage multiple users as spatially distributed transmission resources, requiring significant signal processing. Multi-user MIMO can generalized into two categories: MIMO broadcast channels (MIMO BC) and MIMO multiple access channels (MIMO MAC) for downlink and uplink situations, respectively. Single-user MIMO can be represented as point-to-point, pairwise MIMO.

Many Antennas is a smart antenna technique, which overcomes the performance limitation of single user MIMO techniques. In cellular communications, the number of the maximum considered antennas for downlink is 2 and 4 to support LTE and IMT-A requirements, respectively, though arrays of 8-64 or more antennas have been proposed. With large antenna arrays, such techniques as New SDMA: MU-MIMO, Network MIMO (COMP), Remote radio equipments; New beamforming: linear beamforming such as MF, ZF and MMSE and nonlinear beamforming such as THP, VP, and DPC; New antenna array: direct, remote and wireless antenna array; Direct antenna array: linear and 3D phased array, new structure array, and dynamic antenna array; and Remote and wireless antenna array: distributed antenna array and cooperative beamforming may be employed, alone or in combination or subcombination.

FIG. 5 shows several DBB signals separately upconverted (with different LOs), which are then combined digitally to generate the signal to be transmitted. Three such DBB signals are shown for simplicity, but many more could be included, since the present approach is compatible with extremely broadband signals, in principle all the way to the carrier frequency. In order to combine a plurality of communication streams at a radio frequency data rate, a digital combiner may be employed. See, U.S. 2008/0101501, expressly incorporated herein by reference.

FIG. 5 describes an alternative Digital-RF™ Optical Transmit Architecture. Several Digital Baseband Synthesizers (101, 102, 103) are upconverted in respective Digital Upconverters (104, 105, 106), where Digital Local Oscillators are implied but not shown. The resulting Digital-RF™ signals are combined in a Digital Combiner Unit 107, essentially a fast digital adder. The combined, broadband Digital-RF™ signal is then subjected to further digital processing at RF in Digital Crest Factor Reduction Unit 108, Digital Predistortion Unit 109, and Digital Encoder Unit 110 (which may convert from an N-bit signal to an oversampled 1-bit signal). In a preferred embodiment, Units 104-110 would be expected to be carried out using RSFQ superconducting components mounted on Cryocooler 111. The resulting Digital-RF™ signal is then amplified in Digital Amplifier 112 and maintained in pulse format. This Digital-RF™ signal is then modulated onto Digital Optical Link 114 using Digital Electro-Optical modulator 113. The optical signal is received on the Tower Unit by Digital Opto-Electronic Demodulator 115, and the resulting digital electrical signal is filtered in Bandpass Filter (BPS) 116, thus converting the oversampled pulse train to an analog RF signal, which is passed to Power Amplifier 117 and transmitted by Antenna 118.

FIG. 5 thus displays several blocks of digital signal processing at radio frequencies, following the digital-RF™ combiner. These include a block for Digital Crest Factor Reduction (DCFR), Digital Predistortion, and Digital Encoder. These blocks indicate sequential processing of the Digital-RF™ signal, although in practice they may be appropriately integrated in a single digital-RF processing unit. The need for DCFR reflects the observation that combination of multiple signals at different frequencies will inevitably increase the peak-to-average power ratio (PAPR), also known as the Crest Factor (CF). This increase in PAPR will tend to reduce the power efficiency of the power amplifier (PA) on the tower unit, which is undesirable. Several techniques are known in the prior art for reducing the PAPR without excessive distortion of the signal, although these prior art techniques are applied to the baseband signal, or equivalently to the envelope of the RF signal. In the diagram in FIG. 5, digital processing is applied directly to the full digital-RF signal, which provides additional flexibility for reducing PAPR in broadband signals. The DCFR is followed by the Digital Predistorter, as described earlier in reference to FIG. 2, and the Digital Encoder, which is further described below.

FIG. 5 also shows a variant approach to the optical link for the transmitter. Recall that FIG. 2 discloses the use of broadband analog electro-optical converters, in contrast to the baseband digital link of the prior art. This also requires a fast radio frequency capable DAC. In an alternative approach, a multibit digital signal may be converted to a single-bit oversampled signal using a digital delta-sigma modulator or another digital encoder such as that disclosed in U.S. Pat. No. 6,781,435, expressly incorporated herein by reference. Such a single-bit signal, at a very high rate (possibly approaching 100 GHz) might be used to drive a digital E/O modulator, which would then regenerate an oversampled digital domain radio frequency rate signal on the tower. This could be readily converted to an analog signal simply by filtering out the high-frequency noise, as is customary for delta-sigma DACs. The advantage of such a digital link is that it is not subject to nonlinear distortion. A possible disadvantage is that it requires an enormous bandwidth on the E/O and O/E converters. In another variant (not shown in FIG. 5), each bit of the multibit digital domain radio frequency rate signal could be separately transmitted to the tower, and combined in a multi-bit digital amplifier such as that disclosed in U.S. patent application Ser. No. 12/002,592, expressly incorporated herein by reference. This requires, for example, adding multiple digital domain radio frequency rate amplifiers and a precision analog RF combiner on the tower, but the digital sample rate would be much reduced, relaxing the requirements on the digital E/O and O/E converters.

Note that the technology of digital communication on optical fibers lends itself to sending multiple independent digital signals on the same fiber between the base unit and the tower unit. This is accomplished by multiplexing two or more signals at slightly different wavelengths, and is known as wavelength division multiplexing, or WDM. These digital signals at different wavelengths could represent multiple bits of the same digital signal, or alternatively a deserialized bit stream, or even completely independent signals. The multiple signals would then be demultiplexed at the receiving end of the fiber, without significant crosstalk or interference among the signals. The decision on how to partition multiple digital signals among optical fibers may be determined in specific cases by considerations of performance and cost.

FIG. 6 provides a block diagram of a digital domain Linearizer, employing a plurality of Lookup Tables, which operates at RF on Digital-RF™ Input signal 120 to generate a pre-distorted (or post-distorted) Digital-RF™ output signal 130. The linearizer comprises three parallel channels, reflecting a control system with proportional, integral, and differential control. Each channel has its own Lookup Table Memory (123, 125, 127). The differential channel is generated by Digital Differentiator 126, and the integral channel by Digital Integrator 122. All three channels are combined using Digital Combiner 128, with Digital Delay 124 included to maintain proper pipelining and synchronization among parallel channels.

This system operates not on the amplitude and phase of the signal, as in conventional linearizers, but on the sampled RF signal itself. For this reason, it is not limited to narrowband signals, but rather accounts for harmonics of the RF signal. Since strong nonlinearities generate harmonics, this digital domain radio frequency rate approach is useful in broadband systems where the intermodulation products extend much more widely than the signal itself. FIG. 6 shows that each linearizer (for either predistortion or post-distortion) could include up to three distinct lookup tables (LUT), corresponding in principle to the Proportional, Integral, and Differential components of the PID controller. The proportional LUT would generate a distorted output reflecting the instantaneous value of the digital domain radio frequency rate waveform, while the differential LUT would reflect slew-rate (or frequency-dependent) effects, and the integral LUT would reflect issues of average applied power. These LUT are based on detailed model(s) of the relevant amplifier or optical links, but the values of the LUTs could be periodically refreshed, possibly by a self-adaptive mechanism, in a dynamic control system. Because the outputs of the PID LUTs are digitally combined (added) at the output, all parallel circuits are preferably properly synchronized by proper pipelining, with delay elements added as needed.

One consideration in addressing linearity issues is the tradeoff between linearity on the one hand and efficiency (as well as cost, weight, and system complexity) on the other hand. It is well known that one may improve linearity in PAs by selecting a PA with excess capacity, and operating well below saturation capacity in the linear regime, a procedure known as "backoff". A similar constraint may be present in high-linearity optical converters. The advantage of using digital domain radio frequency rate linearizers is that a system designer has the flexibility to select devices and operate them in a regime that may be relatively nonlinear, while correcting these nonlinearities with digital processing. Indeed, a component with well characterized non-linearities may be used in preference to one which is more linear, but for which the residual non-linearities are more complex, or less characterized, or less predictable. This will permit an increase in system efficiency with decreased cost and weight of hardware on the tower.

A related issue is associated with combined RF signals having a large peak-to-average-power ratio (PAPR), which is inevitable in wideband signals based on orthogonal frequency-domain multiplexing (OFDM) and similar approaches. A large PAPR is undesirable in that it may lead to use of PAs (and optical converters) with excess dynamic range and capacity, which can be inefficient and expensive. The prior art has identified algorithms, operating on baseband signals, that can decrease PAPR somewhat, typically in exchange for some nonlinear spectral broadening. However, in accordance with an embodiment of the present invention, the digital domain radio frequency rate linearizers may be selectively programmed to reduce the PAPR by operating directly on the digital signal. This may permit an improved optimization and tradeoff for very broadband RF signals.

The prior art has also identified several multi-amplifier approaches for increasing the efficiency of PAs. These include Doherty amplifiers, polar modulation (envelope elimination and tracking), and outphasing amplifiers (linear amplification with nonlinear components, or LINC). While the examples provided herein demonstrate single-channel PAs, this in no way excludes the use of one or more of these more sophisticated amplifier techniques, which would provide correspondingly improved performance. Similar digital domain radio frequency rate techniques including digital domain radio frequency rate linearization and broadband optical links may be applied by one skilled in the art to systems comprising these alternative amplifier designs.

What is claimed is:

1. A radio frequency transceiver, comprising:
a power amplifier which receives a digital signal, located proximate to an antenna system, configured to:
generate a power amplified radio frequency signal having at least an output amplitude modulated dependent on the digital signal, and
to transmit the power amplified radio frequency signal having at least the output amplitude modulated dependent on the digital signal through the antenna system;
a signal receiver, located proximate to the antenna system, configured to receive a radio frequency signal from the antenna system; and
a base, located remotely from the antenna system, configured to interconnect with a physical communications link providing a digital signal to the power amplifier, and receive an analog representation of the received radio frequency signal from the signal receiver,
the base processing a source signal to produce the digital signal, and processing the analog representation of the received radio frequency signal to produce a digital representation of the analog representation.

2. The radio frequency transceiver according to claim 1, wherein the base communicates with the signal receiver through an optical fiber and communicates with the power amplifier through an optical fiber.

3. The radio frequency transceiver according to claim 1, wherein the digital signal is digitally predistorted to compensate for at least one analog characteristic of the power amplifier or antenna system.

4. The radio frequency transceiver according to claim 1, wherein the base communicates with a plurality of power amplifiers and a plurality of signal receivers.

5. The radio frequency transceiver according to claim 1, wherein the base communicates with a plurality of power amplifiers and a plurality of signal receivers, respectively proximate to a plurality of antenna systems at respectively different locations.

6. The radio frequency transceiver according to claim 5, wherein the base communicates through a plurality of optical fibers with the plurality of power amplifiers and the plurality of signal receivers, respectively proximate to the plurality of antenna systems at the respectively different locations.

7. The radio frequency transceiver according to claim 1, wherein the base comprises a superconducting digital processor and a cryocooler.

8. A method of transmitting and receiving radio frequency signals through an antenna system, comprising:
providing an antenna system, a power amplifier located proximate to the antenna system, which receives a digital signal and produces a power amplified radio frequency signal having at least an amplitude dependent on the digital signal, for transmission through the antenna system, a signal receiver located proximate to the antenna system, and a base, located remotely from the antenna system;
interconnecting the power amplifier and the base with a physical communications link configured to communicate using a digital signal, and the signal receiver and the base with a physical communications link configured to communicate an analog representation of a received radio frequency signal;
processing, at the base, a source signal to produce the digital signal;
transmitting the power amplified radio frequency signal from the antenna system corresponding to the digital signal received by the power amplifier from the base;
receiving the analog representation of the received radio frequency signal by the base from the signal receiver corresponding to a radio frequency signal received by the antenna system; and
processing, at the base, the received analog representation of the received radio frequency signal to produce a digital representation of the received analog representation of the received radio frequency signal.

9. The method according to claim 8, further comprising communicating the received analog representation of the received radio frequency signal from the signal receiver to the base through an optical fiber.

10. The method according to claim 8, further comprising communicating the digital signal from the base to the power amplifier through an optical fiber.

11. The method according to claim 8, wherein the base comprises an oversampling analog to digital converter configured to digitize the received analog representation of the received radio frequency signal.

12. The method according to claim 8, further comprising digitally predistorting the digital signal at the base to compensate for at least one analog characteristic of the power amplifier or antenna system.

13. The method according to claim 8, further comprising communicating between the base and a plurality of power amplifiers and a plurality of signal receivers, respectively proximate to a plurality of antenna systems at respectively different locations through a respective plurality of optical fibers.

14. A radio frequency transceiver, comprising:
a power amplifier system having an amplifier output, configured to receive a digital signal, and to produce a power amplified radio frequency emission having at least an amplitude dependent on the digital signal from the amplifier output corresponding to an analog representation of information in the digital signal, from a co-located antenna system;
a signal receiver system, co-located with the antenna system, configured to receive a radio frequency signal from the antenna system and to produce an analog radio frequency output signal corresponding to the received radio frequency signal; and
a base system, located remotely from the antenna system, configured to:
process a source signal to produce the digital signal;
interconnect with at least one physical communications link configured to communicate the digital signal to the power amplifier system;
receive the analog radio frequency output signal from the signal receiver system; and
process the received analog radio frequency output signal to produce a digital representation of the analog radio frequency output signal.

15. The radio frequency transceiver according to claim 14, wherein the base system is configured to communicate with the signal receiver system through an optical fiber and to communicate with the power amplifier through an optical fiber.

16. The radio frequency transceiver according to claim 14, wherein the digital signal is digitally predistorted to compensate for at least one analog characteristic of at least one of the power amplifier system and the antenna system.

17. The radio frequency transceiver according to claim 14, wherein the base system is configured to communicate with a plurality of power amplifier systems and a plurality of signal receiver systems, respectively proximate to a plurality of antenna systems at respectively different locations.

18. The radio frequency transceiver according to claim 17, wherein the base system is configured to communicate through a plurality of optical fibers with the plurality of power amplifier systems and the plurality of signal receiver systems, respectively proximate to the plurality of antenna systems at the respectively different locations.

19. The radio frequency transceiver according to claim 14, wherein the base system comprises a superconducting digital processor and a cryocooler.

20. The radio frequency transceiver according to claim 14, wherein the base system comprises at least one superconducting digital channelizer.

* * * * *